United States Patent
Fox et al.

(10) Patent No.: US 11,914,954 B2
(45) Date of Patent: Feb. 27, 2024

(54) METHODS AND SYSTEMS FOR GENERATING DECLARATIVE STATEMENTS GIVEN DOCUMENTS WITH QUESTIONS AND ANSWERS

(71) Applicant: VIRGINIA TECH INTELLECTUAL PROPERTIES, INC., Blacksburg, VA (US)

(72) Inventors: Edward A. Fox, Blacksburg, VA (US); Saurabh Chakravarty, Christiansburg, VA (US); Raja Venkata Satya Phanindra Chava, Herndon, VA (US); Maanav Mehrotra, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 603 days.

(21) Appl. No.: 17/113,880

(22) Filed: Dec. 7, 2020

(65) Prior Publication Data

US 2021/0174016 A1 Jun. 10, 2021

Related U.S. Application Data

(60) Provisional application No. 62/945,202, filed on Dec. 8, 2019.

(51) Int. Cl.
*G06F 40/205* (2020.01)
*G06F 40/279* (2020.01)
(Continued)

(52) U.S. Cl.
CPC .......... *G06F 40/205* (2020.01); *G06F 40/279* (2020.01); *G06N 3/044* (2023.01);
(Continued)

(58) Field of Classification Search
CPC ............................. G06F 40/205; G06F 40/279
See application file for complete search history.

(56) References Cited

U.S. PATENT DOCUMENTS

2018/0033092 A1* 2/2018 Wang .................... G06Q 40/123
2019/0220513 A1* 7/2019 Xin ......................... G10L 15/22

OTHER PUBLICATIONS

Chakravarty, S., Chava, R.V.S.P. and Fox, E.A., Jun. 2019. Dialog Acts Classification for Question-Answer Corpora. In ASAIL@ ICAIL. Jun. 2019.*

(Continued)

*Primary Examiner* — Ibrahim Siddo
(74) *Attorney, Agent, or Firm* — Thomas Horstemeyer, LLP

(57) ABSTRACT

Described herein are systems and methods to enable generation of high-quality summaries of documents that have questions and answers. To help summarize such documents, parsing methods are disclosed that account for different document formats. Methods are disclosed to anonymize personal and identifying information present in the documents. An ontology is defined to categorize dialog acts for the questions and answers present. Classifiers are disclosed based on this ontology. Methods are also disclosed to transform a question-answer pair to a canonical form. Based on the dialog acts for the question and answer combination, transformation methods were developed that build upon each of traditional NLP, and deep learning, techniques.

20 Claims, 37 Drawing Sheets

(51) Int. Cl.
*G06N 3/044* (2023.01)
*G06N 20/00* (2019.01)
*G06Q 30/018* (2023.01)
*G06Q 50/26* (2012.01)

(52) U.S. Cl.
CPC .......... *G06N 20/00* (2019.01); *G06Q 30/018* (2013.01); *G06Q 50/265* (2013.01)

(56) References Cited

OTHER PUBLICATIONS

Chakravarty, S., Chava, R.V.S.P. and Fox, E.A., Jun. 2019. Dialog Acts Classification for Question-Answer Corpora. In ASAIL@ ICAIL. (Year: 2019).*

Kalchbrenner, Nal; et al. "A convolutional neural network for modelling sentences." arXiv preprint arXiv:1404.2188 (2014).

Kim, Y. "Convolutional neural networks for sentence classification." Empirical Methods in Natural Language Processing (EMNLP), (2014) pp. 1746-1751.

Bahdanau, Dzmitry; et al. "Neural machine translation by jointly learning to align and translate." arXiv preprint arXiv:1409.0473 (2014).

Gu, Jiatao, et al. "Incorporating copying mechanism in sequence-to-sequence learning." arXiv preprint arXiv:1603.06393 (2016).

Banerjee, Siddhartha; et al. "Generating abstractive summaries from meeting transcripts." Proceedings of the 2015 ACM Symposium on Document Engineering. 2015.

Vaswani, Ashish, et al. "Attention is all you need." Advances in neural information processing systems. 2017.

Demszky, Dorottya; et al. "Transforming question answering datasets into natural language inference datasets." arXiv preprint arXiv:1809.02922 (2018).

Devlin, Jacob, et al. "Bert: Pre-training of deep bidirectional transformers for language understanding." arXiv preprint arXiv:1810.04805 (2018).

Hochreiter, Sepp; et al. "Long short-term memory." Neural computation 9.8 (1997): 1735-1780.

Loper, Edward; et al. "Nltk: The natural language toolkit." arXiv preprint cs/0205028 (2002).

Mast, Marion, et al. "Dialog act classification with the help of prosody." Proceeding of Fourth International Conference on Spoken Language Processing. ICSLP'96. vol. 3. IEEE, 1996.

Carletta, Jean, et al. "The AMI meeting corpus: A pre-announcement." International workshop on machine learning for multimodal interaction. Springer, Berlin, Heidelberg, 2005.

Cho, Kyunghyun, et al. "On the properties of neural machine translation: Encoder-decoder approaches." arXiv preprint arXiv:1409.1259 (2014).

Barahona, Lina M. Rojas, et al. "Exploiting sentence and context representations in deep neural models for spoken language understanding." arXiv preprint arXiv:1610.04120 (2016).

Kim, Su Nam; et al. "Classifying dialogue acts in one-on-one live chats." Proceedings of the 2010 Conference on Empirical Methods in Natural Language Processing. 2010.

Quarteroni, Silvia; et al. "Simultaneous dialog act segmentation and classification from human-human spoken conversations." 2011 IEEE International Conference on Acoustics, Speech and Signal Processing (ICASSP). IEEE, 2011.

Stolcke, Andreas, et al. "Dialogue act modeling for automatic tagging and recognition of conversational speech." Computational linguistics 26.3 (2000): 339-373.

Castro, Eduardo PS, et al. "Classifying short unstructured data using the Apache Spark platform." 2017 ACM/IEEE Joint Conference on Digital Libraries (JCDL). IEEE, 2017.

Radford, Alec, et al. "Language models are unsupervised multitask learners." OpenAI blog 1.8 (2019): 9.

Král, Pavel; et al. "Automatic dialogue act recognition with syntactic features." Language resources and evaluation 48.3 (2014): 419-441.

Mikolov, Tomas, et al. "Distributed representations of words and phrases and their compositionality." Advances in neural information processing systems. 2013.

Zhou, Peng, et al. "Attention-based bidirectional long short-term memory networks for relation classification." Proceedings of the 54th annual meeting of the association for computational linguistics (vol. 2: Short papers). 2016.

Chakravarty, Saurabh; et al. "Dialog Acts Classification for Question-Answer Corpora." ASAIL@ ICAIL. 2019.

Ermakova, Liana. "Automatic summary evaluation. Roug e modifications." RuSSIR 2012 (2012).

Srivastava, Nitish, et al. "Dropout: a simple way to prevent neural networks from overfitting." The journal of machine learning research 15.1 (2014): 1929-1958.

Lin, Chin-Yew. "Rouge: A package for automatic evaluation of summaries." Text summarization branches out. 2004.

Mihalcea, Rada; et al. "Textrank: Bringing order into text." Proceedings of the 2004 conference on empirical methods in natural language processing. 2004.

Murray, Gabriel; et al. "Generating and validating abstracts of meeting conversations: a user study." Proceedings of the 6th International Natural Language Generation Conference. 2010.

Galgani, Filippo; et al. "Combining different summarization techniques for legal text." Proceedings of the workshop on Innovative hybrid approaches to the processing of textual data. 2012.

Jurafsky, Dan, et al. "Lexical, prosodic, and syntactic cues for dialog acts." Discourse Relations and Discourse Markers. 1998.

* cited by examiner

300⟶ Deposition of David Smith 1⟶305

```
1  Morely USA.
2           DAVID SMITH, PhD,
3  having first been duly sworn, was exmined
4         and testified as follows:
5               EXAMINATION⟶320
6    BY MR. MARTIN
7  Q  Good morning. Thank you for your cooperation
8  in appearing remotely with me by Skype. My
9  name is Philip Martin. I'd like to just get
10 started by asking you to state your full name
11 and yourprofessional address?
```

LITIGATION SERVICES ⟶310

Deposition of David Smith 2

```
1  Q. Is there smoking allowed in that office?
2  A. Yes, there is.
3  Q. And do people smoke around you in that office?
4  A. On occasion, yes, they do.
5  Q. And that smoking doesn't bother you?⟶325
6  A. No.
7  Q. What do you think about states like
8  California that have banned smoking in all public
9  places including restaurants and bars?
10    MR. ROBERTS: Object to the form.
11 A. What do I think?
12 Q. Personal reaction to that.
13 A. I think that's kind of extreme.⟶330
```
⟵315

LITIGATION SERVICES

Deposition of David Smith 3

```
1  MR. JOHN: Very good. Thank you.
2  MR. MARTIN: All right. Thank You.    ⟶335
3  THE VIDEOGRAPHER: This concludes the video
4  deposition of Dr. DAVID SMITH, day 1. The time
5  going off the record is 1:48 p.m.
```

LITIGATION SERVICES

| | |
|---|---|
| Robert Smith January 12, 2016 | 615 |

610

88

```
1    EXMINATION BY MR. WILLIAM:
2    Q:Sir, would you please tell us your full name.
3    A:Robert Smith.
4    Q:Mr. Smith, my name is Ron William, and I represent
5    the Langley family in the lawsuit that brings us all
6    together today. You and I have not talked before,
7    correct?
8    A: That is correct.
9    Q:Let me ask you, sir, you have been identified on
10   behalf of Morely USA, Inc., which I will probably just
11   refer to as Morely, if that's satisfactory.
12   A: Yes.
13   MR. WATSON: Ron, I'm not sure he has been identified as
14   a rebuttal expert. He has been identified as an expert
15   witness.
16   MR. WILLIAM: No, sir, he has been identified as a
17   rebuttal expert in the disclosure in this case.
```

605

U.S. LEGAL SUPPORT
{000} 123-2222        620

625

Source: https://www.unknowtext.abcd.123/img/gbdf0000

EXMINATION BY MR. WILLIAM:
Q:Sir, would you please tell us your full name.
A:Robert Smith.
Q:Mr. Smith, my name is Ron William, and I represent the Langley family in the lawsuit that brings us all together today. You and I have not talked before, correct?
A: That is correct.
Q:Let me ask you, sir, you have been identified on behalf of Morely USA, Inc., which I will probably just refer to as Morely, if that's satisfactory.
A: Yes.
MR. WATSON: Ron, I'm not sure he has been identified as a rebuttal expert. He has been identified as an expert witness.
MR. WILLIAM: No, sir, he has been identified as a rebuttal expert in the disclosure in this case.

FIG. 7

```
deposition:[
  {
    "examiner":"Ron William        ~805
    "examination":[
                    ~810
      {
        "question" : "Sir, would you please tell us your full name."
        "answer" : "Robert Smith."
      },
      {
        "question" : "Mr.Smith, my name is Ron William, and I represent
        the Langley family in the lawsuit that brings us all together today. you
        and I have not talked before, correct?"
        "answer" : "That is correct."
      },                              ~815
      {
        "question":"Let me ask you. Sir, you have been identified on behalf
        of Morely USA, Inc., which I will probably just refer to as Morely
        if that's satisfactory."
        "answer":"Yes."
      },
      {
        "speaker":"Watson"
        "spoke":"Ron, I'm not sure he has been identified as a rebuttal expert   ~820
        he has been identified as an expert witness."
      },
      {
        "speaker":"Ron William"
        "spoke":"No, sir, he has identified as a rebuttal expert in the disclosure
        in this case."
      }
    ]
  }
]
```

| Entity type | Anonymization Method | Pre-Anonymization Form | Post-anonymization Form |
|---|---|---|---|
| Address | NER with external library | My address is 234 Riverdale Dr., Chattanooga, TN. | My address is ADDRESS1. |
| Age | Regex | I am 33 years old and my wife is 30. | I am AGE1 years old and my wife is AGE2. |
| Date | Regex | I resigned from my job on 3rd December, 1987. | I resigned from my job on DATE1. |
| Email ID | Regex | My email id jameswritter@yahoo.com. | My email id EMAIL1. |
| Location | NER | I lived in Virginia Till high school. | I Lived in LOCATION1 till high school. |
| Name of individuals | NER with pseudonymization | John Smith was my boss when I worked at the bakery. Mr. Smith was a very understanding boss. | Ian Jones was my boss when I worked at the bakery. Mr. Jones was a very understanding boss. |
| Name of oraganizations | NER | I worked for Virginia Tech for 5 years. | I worked for ORG1 for 5 Years. |
| Phone number | Regex | I am on reachable on 101-123-555. | I am reachable on PHONE1. |

FIG. 10

Phone Number ← 1110

(\d{3}[-\.\s]??\d{3}[-\.\s]??\d{4}|\(\d{3}\))\s*\d{3}[-\.\s]??\d{4}|\d{3}[-\.\s]??\d{4})"

E-Mail ID (\b[\w.]+@+[\w.]+.+[\w.]\b) ← 1120

FIG. 11

LOCATION & ORGANIZATION

John Smith used to work at Walmart in Reston in the year 2017. ⌒1210

[('John Smith', '0'), ('used', '0'), ('to', '0'), ('work', '0'), ('at', '0'), ('Walmart', 'ORGANIZATION'), ('in', '0'), ('Reston', 'LOCATION'), ('in', '0'), ('the', '0'), ('year', '0'), ('2017', '0'), ('.', '0')] ⌒1220

PERSON1 used to work at ORG1 in LOCATION1 in the year 2017. ⌒1230

FIG. 12

ADDRESS

I used to live in 118e, 16th Street, Rolla, MO. ~1310

[('I', 'Recipient'), ('Used', 'Recipient'), ('to', 'Recipient'), ('live', 'Recipient'), ('in', 'Recipient'), ~1320
('118E', 'AddressNumber'), ('16th', 'StreetName'), ('Street', 'StreetNamePostType'),
('Rolla', 'PlaceName'), ('MO', 'StateName')]

I used to live in ADDRI. ~1330

FIG. 13

INDIVIDUAL NAME

Johnson→White     ← 1505
David→Luke
John→Alex
Douglas→Sanders
Neil →Jamie
Simmons → Philips Mr. David Johnson→Mr. Luke White   ← 1510

Neil Simmons→Jamie Phillips

Mr. John Douglas→Mr. Alex Sanders

John Simmons→Alex Phillips

Mr. Johnson→Mr. White   ← 1515

Mr. Simmons→Mr. Phillips

Mr. Douglas→Mr. Sanders

FIG. 15

Age

Lemmatized Words → age/old → dependency tree → POS tag "NUM"  /1605

Question: What is the age of Robert? /1610

Answer: Roberts is 32 years Old. /1615

Lemmatization alone can't process age /1620

Question: How old is Robert /1625

Answer: Robert is 32. /1630

In this case, we perform POS tagging, lemmatization, and dependency parsing with several constraints. /1635

```
{
  "LOCATION1" : "Philadelphia",
  "LOCATION2" : "Pennsylvania",
  "LOCATION3" : "Hampton Roads",
  "LOCATION4" : "Norfolk",
  "LOCATION5" : "Virginia",
  "LOCATION6" : "U.S.",
  "ORG1" : "Phillip Morely USA, Inc",
  "ORG2" : "Alpha Client Services",
  "ORG3" : "USA",
  "ORG4" : "PM USA's",
  "ORG5" : "Court",
  "ORG6" : "the Securities and Exchange Commission,",
  "ORG7" : "Macrogen",
  "ORG8" : "Inc",
  "ORG9" : "University",
  "PHN1" : "1238529871",
  "UNK_DATE1" : "1984",
  "UNK_DATE2" : "1983",
  "UNK_DATE3" : "June",
  "UNK_DATE4" : "June 1986",
  "UNK_DATE5" : "October 1991",
  "UNK_DATE6" : "October of 1991",
  "UNK_DATE7" : "July",
}
```

1710

```
{
  "Fiolty" : "Lisa",
  "Kwirfy" : "Andrew Gonzalez",
  "Hiferk" : "Blackwell",
  "F" : "Rodriguez",
  " Watsson" : "Schmidt",
  "Watsson" : "Johnson",
  "Wonicy" : "Jill Blackwell",
  "Toro" : "Kyle",
  "Niollo" : "Carlos Erickson",
  "Rozzby" : "Jade Pace",
  "Horbax" : "Toni May",
  "moriox" : "Pam Williams",
  "Lozzby" : "Robert",
  "Foroly" : "Gregory Larsen",
  "Jozti" : "Danielle Abbott",
  "Ronity" : "Danielle Walker",
  "Honiry" : "Jason",
  "Kidsor" : "Nancy",
  "Wengty" : "Kathy",
  "MR" : "Steven",
  "Yorbax" : "Krickson",
  "Zengary" : "Jamie Phillips",
  "Eirmon" : "Jamie Phillips",
  "Nairox" : "Jamie Phillips",
  "ORG1" : "David",
  "ORG3" : "Dustin",
  "FM US" : "Rick Gomez",
  "Battex" : "Melisssa",
  "Baffa" : "May",
  "Jon Watsson" : "Eric Johnson",
  "Bon" : "Eric",
  "Smith" : "Phillips",
  "Dna.Pp" : "Everett",
  "Rovty" : "Pace",
  "Ate" : "Monica",
  "Syanty" : "Miguel",
  "Bovty" : "Anthony",
}
```

1805 Load the parsed and anonymized delimited text file into memory

1810 Extract the question and answer text

1815 Pre-process the question and answer text to remove noise

1820 Load a classifier instance into memory

1825 Use the classifier instance to classify the dialog act of the question-answer groups based on the defined ontology

1830 Store the classified question-answer groups

FIG. 18

| Category | Description | Example |
|---|---|---|
| wh | This is a wh-* kind of question. These questions generally start with question words like who, what, where, when, why, how, etc. | What time did you wake up on the morning the incident took place? |
| wh-d | This is also a wh-* kind of question. But if there is more than one statement in a what question, it is a what-declarative question. These questions have some information prior to the actual question which relates to the question. | You said generally wake up at 7:00 am in the morning. But what time did you wake up on the morning the incident took place? |
| bin | This is a binary question. These are questions that can be answered with a simple "yes" or "no". | Is that where you live? |
| bin-d | This is binary-declarative question which can also be answered with a "yes" or a "no". But, in a binary-declarative question, the person who asks the question knows the answer but asks for verification. In contrast, a binary question indicates the examiner seeks to know which is the actual answer. | That is where you live, right? |
| qo | This is an open question. These questions are general questions which are not specific to any context. These questions are asked to know the opinions of the person who is answering. | Do you think Mr. Pace made a good decision? |
| or | This is a choice question. Choice questions are questions that offer a choice of several options as an answer. They are made up of two parts, which are connected by the conjunction "or". | Were you working out for fun or were you into body building? |

FIG. 19

| Category | Description | Example |
|---|---|---|
| num | It is a what question specific to numeric quantities. | What is the age of your daughter? |
| hum | It is a what question specific to human beings. | What is the name of your daughter? |
| loc | It is a what question specific to locations. | What is the name of the city where your daughter lives? |
| ent | It is a what question specific to other entities. | What is the email of your daughter? |
| des | It is a what question which generally ask descriptive questions. | What were you doing there at that point of time? |

FIG. 20

| Category | Description | Example |
|---|---|---|
| y | It is a category when a person answering the question means yes. The answer sentence can take various forms and the answer need not be exactly "yes". | "yes"","yeah","Of course","definitely It is","that's right","Iam sure",etc. |
| y-d | It is a category when a person answering the binary question not only says yes but also given an explanation for this answer. | Yes. I play badminton because my doctor advised me to. |
| y-followup | The answer is yes, but in the answer, there is another question Which pertains to the question asked. | Yes i have seen them. But what do you mean by inside the elevator? |
| n | It is a category when a person answering the question means no. Again, the answer need not be exactly "no". | "No", "i don't think so", "certainly not"," i am afraid not", etc. |
| n-d | It is a category when a person answering the binary question not only says no but also given an explanation for this answer. | No. I am not interested in playing cricket because it takes a lot of time |
| n-followup | The answer is no, but in the answer, there is another question which pertains to the question asked. | That is not me. Do you think that is me? |
| sno | It is a statement which is a non-opinion. This is an informative statement made by the person answering the question. | I Retired from my Job in 2010. |
| so | It is a statement which is an opinion. It is a statement which is actually an opinion of the person answering rather than a general statement. | I believe retiring from my job was the best decision i made. |
| ack | It is a response which indicates acknowledgment. | "Okay", "Um-hum","I See", etc. |
| dno | It is a response given when the person doesn't know, or doesn't recall, or is unsure about the answer to the question asked. | I don't recall what happened that day |
| confront | The answer contains no information. It is a confrontation by the deponent to the question asked. | So do you say that i have given you the wrong information? |

FIG. 21

Q. So were you following sort of a typical daily routine when you came down that day?

A. Yes. I come downstairs every day. I get up at 5:30 in the morning, I go downstairs early.

I was following sort of a typical daily routine when i came down that day. I come downstairs every day. I get up at 5:30 in the morning, I go downstairs early.

Q. What did you do between 5:30 a.m. until you left your apartment and went down to the lobby?

A. Probably took a shower, got dressed and ate breakfast and went downstairs.

I probably took a shower, got dressed and ate breakfast and went downstairs between 5:30 am until i left my apartment.

| Type | Text | Dialog Act |
|---|---|---|
| Question | Were you able to do physical exercises before the accident? | bin |
| Answer | Yes. I used to play tennis before. Now I cannot stand continuously for more than 5 minutes. | y-d |
| Canonical Form | I was able to do physical exercises before the accident. I used to play tennis before. Now I cannot stand continuously for more than 5 minutes. | |

2710 — Type
2720 — Text
2730 — Dialog Act

FIG. 27

| DA Combination | Rule Regex | Rule Description |
|---|---|---|
| bin, y<br>bin, n<br>bin-d, y<br>bin-d, n | \<PRP\>\<.*?\>\<VB.*\>\<RB\> | Preposition, followed by any part-of-speech, followed by any verb and adverb |
| | \<VB.*\>\<IN\>? | Any verb form followed by zero or one injunction. |
| | \<.*\>?PRP\>\<.*\>? | Preposition, preceded and succeeded by zero or one part-of-speech. |
| | \<VB.*\>\<.*\>?\<DT\>?\<NN.*\> | Any verb form followed by zero or one injunction, followed by zero or one determiner, followed by a noun |
| sno, sno<br>bin, sno<br>bin-d, sno<br>sno, y<br>sno, n<br>sno, y-d<br>sno, n-d | \<.*\>?PRP\>\<.*\>? | Preposition, preceded and succeeded by zero or one part-of-speech. |
| | \<VB.?\>*\<PR.?\>\<VB.?\>+ | Any verb form followed by any preposition form, followed by one or more verb forms |
| wh, * | \<VB.?\>*\<PR.?\>\<VB.?\>+ | Any verb form followed by any preposition form, followed by one or more verb forms |
| | \<.*\>\<?PRP\>\<.*\>? | Preposition, preceded and succeeded by zero or one part-of-speech. |

FIG. 29

| Qstn DA | Ans. DA | Just Answer | | | Q+A | | | Chunking | | |
|---|---|---|---|---|---|---|---|---|---|---|
| | | R-1 | R-2 | Sim | R-1 | R-2 | Sim | R-1 | R-2 | Sim |
| wh | sno | 0.73 | 0.67 | 0.79 | 0.77 | 0.66 | 0.87 | 0.78 | 0.70 | 0.86 |
| bin | y | 0.09 | 0.03 | 0.29 | 0.75 | 0.56 | 0.84 | 0.85 | 0.70 | 0.90 |
| bin-d | y | 0.016 | 0.002 | 0.11 | 0.81 | 0.70 | 0.90 | 0.9 | 0.81 | 0.93 |
| bin | sno | 0.67 | 0.63 | 0.76 | 0.83 | 0.75 | 0.90 | 0.84 | 0.79 | 0.91 |
| bin | n | 0.08 | 0.04 | 0.36 | 0.72 | 0.54 | 0.81 | 0.83 | 0.70 | 0.91 |
| sno | sno | 0.67 | 0.62 | 0.73 | 0.9 | 0.85 | 0.95 | 0.85 | 0.80 | 0.92 |
| ack | sno | 0.98 | 0.98 | 0.99 | 0.94 | 0.93 | 0.94 | 0.98 | 0.98 | 0.99 |
| wh-d | sno | 0.82 | 0.78 | 0.87 | 0.64 | 0.57 | 0.78 | 0.82 | 0.78 | 0.87 |
| bin | y-d | 0.55 | 0.47 | 0.68 | 0.78 | 0.65 | 0.87 | 0.75 | 0.65 | 0.82 |
| bin | n-d | 0.45 | 0.31 | 0.74 | 0.59 | 0.43 | 0.80 | 0.54 | 0.39 | 0.78 |

FIG. 32A

| Qstn DA | Ans DA | Just Answer | | | Q+A | | | Chunking | | |
|---|---|---|---|---|---|---|---|---|---|---|
| | | R-1 | R-2 | Sim | R-1 | R-2 | Sim | R-1 | R-2 | Sim |
| bin | sno | 0.74 | 0.72 | 0.83 | 0.84 | 0.8 | 0.91 | 0.85 | 0.83 | 0.92 |
| wh | sno | 0.82 | 0.78 | 0.87 | 0.76 | 0.69 | 0.87 | 0.77 | 0.7 | 0.86 |
| bin-d | y | 0.05 | 0.01 | 0.02 | 0.85 | 0.78 | 0.92 | 0.88 | 0.81 | 0.92 |
| bin | y | 0.09 | 0.04 | 0.21 | 0.81 | 0.67 | 0.87 | 0.9 | 0.79 | 0.94 |
| bin | n | 0.11 | 0.05 | 0.36 | 0.79 | 0.64 | 0.85 | 0.88 | 0.77 | 0.94 |
| bin | yd | 0.6 | 0.54 | 0.72 | 0.76 | 0.68 | 0.86 | 0.75 | 0.67 | 0.84 |
| bin | nd | 0.63 | 0.56 | 0.78 | 0.79 | 0.7 | 0.89 | 0.77 | 0.71 | 0.87 |
| bin | dno | 0.78 | 0.75 | 0.86 | 0.74 | 0.7 | 0.85 | 0.83 | 0.8 | 0.9 |

FIG. 32B

| Question DA | Answer DA | ROUGE-1 | ROUGE-2 | Sentence Similarity |
|---|---|---|---|---|
| bin | y | 0.6 | 0.38 | 0.73 |
| bin | n | 0.71 | 0.54 | 0.83 |
| bin | y-d | 0.48 | 0.26 | 0.74 |
| bin | n-d | 0.44 | 0.24 | 0.67 |

FIG. 32C

METHODS AND SYSTEMS FOR GENERATING DECLARATIVE STATEMENTS GIVEN DOCUMENTS WITH QUESTIONS AND ANSWERS

CROSS-REFERENCE TO RELATED APPLICATIONS

This application claims the benefit of and priority to U.S. Provisional Patent Application No. 62/945,202, entitled "METHODS AND SYSTEMS FOR GENERATING DECLARATIVE STATEMENTS GIVEN DOCUMENTS WITH QUESTIONS AND ANSWERS," filed Dec. 8, 2019, the contents of which are incorporated by reference herein in their entirety.

TECHNICAL FIELD

The present disclosure generally relates to document processing, wherein text that includes questions and answers is analyzed, and new text generated, through processing that involves transformation of the questions and answers, in support of a variety of information retrieval, question answering, summarization, and other services.

BACKGROUND

There has been work on summarization in the legal domain, but little on legal deposition summarization. Rather, most of the works on summarization are focused on legal judgments and contracts. An example is machine learning based techniques using different features to summarize legal judgments in the Australian Legal Information Institute (AustLII) corpus. One approach involves using graphs, based on similarity of sentences in legal texts. Another approach assumes that a trial judgment text consists of seven rhetorical roles fact, proceedings, background, proximity, distancing, framing, and disposal. Then, classification techniques can be used to assign rhetorical roles to the sentences, followed by selecting the most relevant sentences from each rhetorical role using sentence ranking mechanisms.

BRIEF DESCRIPTION OF THE DRAWINGS

Further aspects of the present disclosure will be readily appreciated upon review of the detailed description of its various embodiments, described below, when taken in conjunction with the accompanying drawings.

FIG. 3 shows an example of portions of a deposition transcript, according to various embodiments of the present disclosure.

FIG. 4 shows an example of a page from a version of a deposition with four original pages shrunk onto one condensed page, according to various embodiments of the present disclosure.

FIG. 6 shows an example of a page of a deposition transcript that after parsing can yield question-answer groups and then a question-answer data structure, according to various embodiments of the present disclosure.

FIG. 7 shows an example of question-answer groups parsed from an examination portion of a deposition transcript, according to various embodiments of the present disclosure.

FIG. 8 shows an example of a question-answer data structure generated from question-answer groups parsed from an examination portion of a deposition transcript, according to various embodiments of the present disclosure.

FIG. 10 shows an example of a table showing anonymization methods for a representative set of entity types, along with examples for each method with pre- and post-anonymization character strings, according to various embodiments of the present disclosure.

FIG. 11 shows an example of regular expressions for recognizing two types of personal information, namely phone numbers and e-mail identifiers, as part of anonymization processing, according to various embodiments of the present disclosure.

FIG. 12 shows an example of anonymization for two types of personally identifying information, namely location and organization, showing an initial sentence, its tokenized and tagged representation, and the resulting anonymized sentence, according to various embodiments of the present disclosure.

FIG. 13 shows an example of anonymization for address information, showing an initial sentence, its tokenized and tagged representation, and the resulting anonymized sentence, according to various embodiments of the present disclosure.

FIG. 15 shows an example of a list of three steps for anonymization of individual names, with examples of the replacement of names by anonymized names, according to various embodiments of the present disclosure.

FIG. 16 shows an example of an explanation of three constraints related to anonymization of ages, along with two example question-answer groups, and processing steps for their anonymization, according to various embodiments of the present disclosure.

FIG. 17 shows an example of two mappings that record an anonymized representation for each of a set of original strings that indicate entities that could be anonymized, according to various embodiments of the present disclosure.

FIG. 18 shows an example of a flow diagram for dialog act classification, according to various embodiments of the present disclosure.

FIG. 19 shows an example of a table of some categories of question dialog acts, each with a description and an example, according to various embodiments of the present disclosure.

FIG. 20 shows an example of a table of some subcategories of "wh-*" type question dialog acts, each with a description and an example, according to various embodiments of the present disclosure.

FIG. 21 shows an example of a table of some categories of answer dialog acts, each with a description and an example, according to various embodiments of the present disclosure.

FIG. 26 shows examples of question-answer groups, along with the result of transforming each of them into a declarative segment, according to various embodiments of the present disclosure.

FIG. 27 shows an example of a question and answer, each with its dialog act, along with the result of transforming the group into a declarative segment, according to various embodiments of the present disclosure.

FIG. 29 shows an example of a table, showing for three groups of dialog act combinations, a set of regular expressions for chunks, along with a description of the rule for that regular expression, according to various embodiments of the present disclosure.

FIGS. 32A-C show examples of tables that include results of experiments conducted for various methods of transforming question-answer groups into declarative segments, according to various embodiments of the present disclosure.

DETAILED DESCRIPTION

Figure 1:
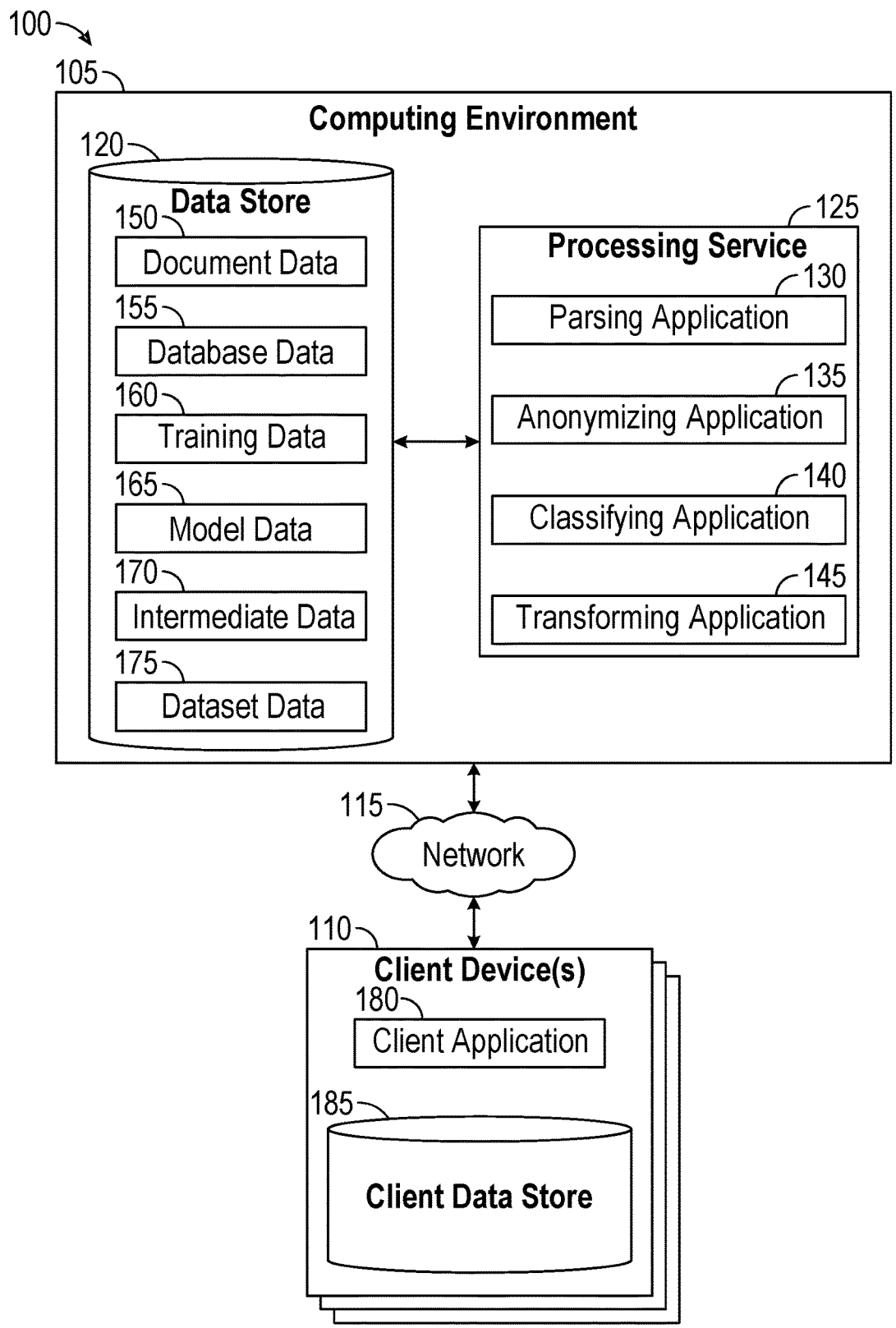
FIG. 1 is example of a networked environment for generating declarative segments from documents containing questions and answers, according to various embodiments of the present disclosure.

Once dialog acts for a question-answer group have been identified, it would be useful to transform the text into a canonical form. Prior to the present disclosure, there does not appear to be a solution to this kind of problem. Natural language processing (NLP) based parsing techniques like Chunking and Chinking can parse the constituents of a sentence based on part-of-speech (POS) tags. The problem of identifying chunks can be viewed as a sequence chunking problem where the chunk is labeled as a whole instead of labeling each word. Each chunk can be labeled using standard Inside-Outside-Beginning (IOB) labels. Though there has been previous work on labeling chunks based on POS tags, each subsequent improvement on this task has been incremental.

These methods have been implemented in NLP libraries like NLTK and spaCy, which have very good performance. Though the efficacy of these libraries is generally task based, an empirical analysis of the results helps make the best choice. In the description below, the NLTK library is discussed regarding performing Chunking and Chinking.

Transforming a question-answer group into a canonical form can also be formulated as a machine translation problem. Though the source and target languages are the same, the input and output differ in form. Some employ an encoder-decoder based approach to translating text from one language to other. The idea is to encode the input sentence into a thought vector using a Recurrent Neural Network (RNN) and then apply the decoder (also an RNN) to the encoded representation to yield a target output sentence. Challenges with vanilla sequence-to-sequence models are that they are repetitive, and the decoder does not always know when to stop. Some of the challenges with the sequence-to-sequence models can be addressed by adding an attention layer over each output of the input RNN cells. Through training, the system learns how to map a source language input word to an output word in the target language, based on the context of the source word.

There has been work in other domains related to conversation summarization. Since the text in a legal deposition is in the form of a conversation, some of the techniques from this area of research could be utilized to process the text and generate a summary. Regarding datasets, the AMI corpus is a multi-modal dataset that contains about 100 hours of recording of meeting conversations. The dataset contains a series of 140 meeting conversations with summaries about different topics involving 4 actors who role-play different roles in a fictitious company. This dataset was created to understand meeting dynamics and the role they play in team effectiveness in an organization. The meeting recordings are in English, but the meeting participants also comprised of non-native English speakers which provide a collection of different speech patterns to perform analysis on. One of the approaches to summarize AMI meeting conversations is to generate abstractive summaries. This avoids the challenges associated with extractive summarization techniques in a conversation. A summary generated by an extractive summarization system is noisy and lacks context and coherence. Thus, an abstractive summary could be more useful and easier to follow for a human. This could be aided by a framework that would generate abstractive summaries of meetings using fully automated and unsupervised techniques. Of benefit would be an ontology that generalizes the Dialog Acts (dialog acts) in the corpus, as the dialog acts contained in the AMI corpus were very meeting-specific. Another approach involves a multi-stage pipeline based on breaking the meeting transcript into topic segments, followed by identifying important utterances in a topic segment, and using graph-based methods to fuse important utterances together.

Early work on Dialog Act Classification used machine learning techniques such as Support Vector Machines (SVM), Deep Belief Network (DBN), Hidden Markov Model (HMM), and Conditional Random Field (CRF). They used features like speaker interaction and prosodic cues, as well as lexical, syntactic, and semantic features, for their models. Some of the works also included context features that were sourced from the previous sentences. For example, some previous methods have used DBN for decoding the dialog act sequences and used both the generative and the conditional modeling approaches to label the dialog acts. As another example, other previous methods have used HMM for modeling the dialog act probabilities with words as observations, where the context was defined using the probabilities of the previous utterance dialog acts.

Systems like COPYNET have added the idea of copying, into sequence-to-sequence models. The argument is that the previous encoder-decoders heavily rely on the "meaning," which may not be enough in all cases. COPYNET can nicely integrate regular word generation techniques in the decoder along with the new copying mechanism which can choose sub-sequences in the input sequence and put them at proper places in the output sequence. Regarding its architecture, the encoder is a bi-directional RNN, used to transform the source sequence into a series of hidden states with equal length. The decoder is a canonical RNN-decoder, but with distinct differences in prediction, updating of state, and reading. There are two modes—generate and copy—and scores are calculated for each of them. COPYNET uses a hybrid strategy for fetching the content which combines both content-based and location-based addressing. Both addressing strategies are coordinated by the decoder RNN in managing the attentive read and selective read, as well as determining when to enter/quit the copy-mode. Experiments indicate that the attentive read of COPYNET is driven more by semantics and the language model and is therefore capable of accessing the memory freely. On three different datasets (simple patterns, text summarization, and single turn dialogs) COPYNET did well, performing significantly better for the single turn dialogs dataset, but also showing improvement with the other two datasets.

Pointer Generator Network (PGN) is an abstractive summary generation system that uses the same idea as COPY-NET but adds more optimizations on how the summary is generated. It addresses two challenges: avoiding the generation of inaccurate text in the summaries, and controlling the repetition of text. It allows the decoder to generate a target word from the source text using the copying mechanism. This was achieved via training on when to generate and when to copy.

For the problem of repetition, the main cause is that the decoder is too reliant on the previously generated target word. A wrongly generated previous target word confuses the decoder, and since it is constrained to generate target words from the input, it starts repeating segments just to maximize the generation probability or the learning objective. To fix the problem of repetition, a coverage mechanism keeps track of what has been generated so far in terms of a word probability distribution. It penalizes the generation of repeating words. During the training process, the system learns whether to generate or copy from the input sentence, and also to minimize the repetition while maximizing the probability of the generated sequence. The discussion below includes a description of how the PGN architecture can help to transform a question-answer group into a canonical form.

One approach is to create generalized templates from summary sentences and leverage the relationships between the summaries and their source conversation transcripts to generate abstract summaries from the AMI corpus. The templates capture the nouns in the summary sentences along with the action verb. The templates from the summary are generated using a multi-stage pipeline. In the first stage, the summary sentences are parsed and the noun phrases are extracted using chunking. A head noun is replaced by its fourth level WordNet hypernym for creating a more generalized template.

Clustering is performed in the next stage, where the verbs from the templates are used to form clusters or communities that have the same root verbs. In the final state of fusion, a template is converted into a graph and similar kinds of template nodes are fused with one another to form the final summary. An extension involves multiple heuristics that are based on finding the similarity between a summary sentence and the community sentences. The heuristics involved using the: whole conversation segment which acted as a baseline, closest turns with respect to cosine similarity between a summary and conversation sentence including and excluding the verbs, and cosine similarity of the average of the word2vec embeddings of the summary and the conversation sentence, respectively. Using these heuristics enables the system to find conversation sentences that convey vital information about a conversation community or segment.

Another framework, to generate abstractive sentences from conversations, includes three main components: community detection, entailment graphs, and multi-sentence fusion. The community detection component creates communities out of similar sentences in the conversation by creating a graph of words for each sentence. The entailment graph is created based on the intuition that certain sentences are entailed by other similar sentences and can be eliminated. The direction of the edge signifies the entailment. The multi-sentence fusion component fuses sentences from the same community together. This component is also responsible for generating the abstractive sentence for the conversation community. The abstractive sentence is a path that is selected after ranking the different paths in the word graph based on fluency, coverage, and edge weights for which some custom rules were defined.

Summaries generated by an automated system can be evaluated for qualitative purposes. Measures like Recall-Oriented Understudy for Gisting Evaluation (ROUGE), Bilingual Evaluation Understudy (BLEU), and Metric for Evaluation of Translation with Explicit ORdering (METEOR), are used to evaluate the quality of system-generated summaries relative to human-generated ones. ROUGE has multiple variants like ROUGE-N, ROUGE-W, ROUGE-L, ROUGE-S, and ROUGE-SU that compare different aspects of summarization.

ROUGE is the most widely used metric in summary evaluations, but it also has multiple limitations. It relies explicitly on lexical n-gram overlap and penalizes any paraphrases or choice of different words. It does not measure the readability or coherence of the summary. It also ignores redundant information and is subject to inflated scores as the summary length grows. On the other hand, from a summarization perspective, one should evaluate a summary using measures for detecting redundancies and ensuring proper coverage of the source text.

Documents that contain sets of questions and answers are produced in a broad range of settings. One example, from the legal domain, is of transcripts of witness depositions or testimony. Deposition transcripts can be in the form of series of questions and answers that can have a specific format and can be recorded by court reporters in real time. Another example of such a type of document is that of Frequently Asked Question (FAQ) files. Other examples can include call center or other conversation transcripts, transcripts of interviews, transcripts of chatbot interactions, and transcripts of talk shows. This type of document can also include all other examples of documents comprising a plurality of questions and answers as can be appreciated.

Natural language processing (NLP) and other operations (e.g., indexing and subsequent searching, summarization) with such documents is problematic because of this mix of questions and answers. Such processing and operations are more easily accomplished when declarative segments are available, rather than questions and answers. There are systems that support question answering, wherein a question is posed, and that question is matched against a question in a collection of questions, and then the system returns the corresponding answer. However, even in such cases, returning a declarative segment that includes content from both the question and the answer, and has similar meaning to that of the group, could be an even better solution.

Thus, there remains a need for methods and systems for natural language generation that overcome the aforementioned deficiencies. Addressing the above concerns can be achieved by generating declarative segments from questions and answers.

In view of the problems noted above, disclosed herein are various embodiments for parsing, anonymization, classification, and transformation of question-answer documents that include text comprising a plurality of questions and answers. The present disclosure includes a dialog act ontology for the conversations in legal depositions. In addition, it includes classification methods to label the questions and answers in the deposition. Methods were also developed to transform a question-answer group into a canonical form that is conducive for further text processing.

Question-answer documents, once received, can be parsed so the text can be readily processed. Proper parsing of question-answer documents may be complicated, but it is important for downstream tasks including but not limited to question-answering, summarization, indexing, and searching. Implementing specific functionality for reading of different file formats can be tedious and time-consuming. Thus, a generalized technique can be implemented to easily parse document files across various formats in a generalized way.

Processing can therefore handle question-answer documents in various formats, like Portable Document Format (PDF), and in various styles, e.g., one original page per document page, or four original pages per document page. Extraneous sections like the front, body, and closing portions of a question-answer document can be identified and discarded. Each question and each answer in the question-answer document can be identified for processing.

Some documents can include personally-identifiable, confidential, or otherwise private information, such as names of people, names of organizations, locations, ages, dates, times, social security numbers, passport numbers, identification numbers, addresses, or other information as can be appreciated. Legislation may require special handling of Personally Identifying Information (PII). Accordingly, before further processing of such a document can proceed, anonymization of confidential and PI data can occur.

To better comprehend the text in a question-answer document, it helps to parse the question-answer groups in the question-answer document and transform them to a simple form on which traditional NLP techniques can be used. Such techniques often are used to identify the root portion of sentences, to determine the core concepts presented in the document. However, traditional NLP techniques like syntax parsing into dependency trees sometimes struggle to find the root of conversational sentences because of their form, and this poses challenges to identify the key concepts using NLP based rules. This is further complicated when the conversation is in the form of a set of question-answer groups.

Humans, on the other hand, readily understand such documents since the number of types of questions and answers is limited, and these types provide strong semantic clues that aid comprehension. Accordingly, it helps to leverage the types found, to aid textual analysis.

Thus, suitable analysis and transformation of the original question and answer text can be used to generate text with the same meaning as the question and answer text, which in turn would facilitate downstream tasks like question answering, summarization, information retrieval, and knowledge graph generation. This is because special rules could be applied to each type of question and answer, allowing conversion oriented to supporting existing NLP tools. This would facilitate text parsing techniques like constituency and dependency parsing, and enable breaking the text into different chunks based on part-of-speech (POS) tags.

This can be done by classifying each question and each answer according to a category based on dialog acts. Dialog Acts (dialog act) can represent the communicative intention behind a speaker's utterance in a conversation. Identifying the dialog act of each speaker utterance in a conversation thus can help to automatically determine intent and meaning. Specific rules can be developed for each dialog act type to process a conversation question-answer group and transform it into a suitable form for subsequent analysis. Developing methods to classify the dialog acts in a conversation thus would help to delegate the transformation task to the right transformer method. According to various embodiments, an ontology of dialog acts for the legal domain, for example, can be defined. Sentences in a question-answer document can be classified into one of the classes.

Classification of questions and answers based on dialog acts can be done with machine learning methods and other methods as can be appreciated. In some embodiments, classification using machine learning can involve training a classifier and applying the resulting classifier with its trained model. This step can be accomplished using several different approaches, including, for example, deep learning.

For a given type of question-answer group, with its different types of question and answer dialog acts, the question-answer group can be converted into a canonical form. There can be a different transformer for each combination of question dialog act and answer dialog act. Therefore, once a question and answer have been classified, the classes of each can indicate what type of transformation is best able to transform from the original question and answer into an equivalent (as to meaning) declarative form, that can be shorter, thus effecting a degree of summarization. This step can be accomplished using several different approaches, including using a combination of chunking and chinking, deep learning, or other transformation approaches as can be appreciated.

The transformation into declarative segments has an aim of producing grammatically correct and semantically-equivalent declarative segments as a rewriting of the question-answer groups. Evaluations and measurements have indicated that when the processes described herein are applied to deposition documents, for example, the resulting documents provide a summary of the original documents, where the compression ratio from original to new documents is roughly 1.5 to 1.

Other systems, methods, features, and advantages of this embodiments of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Before the present disclosure is described in greater detail, it is to be understood that this disclosure is not limited to particular embodiments described, and as such may, of course, vary. It is also to be understood that the terminology used herein is for the purpose of describing particular embodiments only and is not intended to be limiting. The skilled artisan will recognize many variants and adaptations of the embodiments described herein. These variants and adaptations are intended to be included in the teachings of this disclosure.

In the following paragraphs, the embodiments are described in further detail by way of example with reference to the attached drawings. In the description, well known components, methods, and/or processing techniques are omitted or briefly described so as not to obscure the embodiments. As used herein, the "present disclosure" refers to any one of the embodiments described herein and any equivalents. Furthermore, reference to various feature(s) of the "present embodiment" is not to suggest that all embodiments must include the referenced feature(s).

Among embodiments, some aspects of the present disclosure are implemented by a computer program executed by one or more processors, as described and illustrated. As would be apparent to one having ordinary skill in the art, one or more embodiments may be implemented, at least in part, by computer-readable instructions in various forms, and the present disclosure is not intended to be limiting to a particular set or sequence of instructions executed by the processor.

The embodiments described herein are not limited in application to the details set forth in the following description or illustrated in the drawings. The disclosed subject matter is capable of other embodiments and of being practiced or carried out in various ways. Also, the phraseology and terminology used herein is for the purpose of description and should not be regarded as limiting. The use of "including," "comprising," or "having" and variations thereof herein, is meant to encompass the items listed thereafter, additional items, and equivalents thereof. The terms "connected" and "coupled" are used broadly and encompass both direct and indirect connections and couplings. In addition, the terms "connected" and "coupled" are not limited to electrical, physical, or mechanical connections or couplings. As used herein the terms "machine," "computer," "server," "client," and "work station" are not limited to a device with a single processor, but may encompass multiple devices (e.g., computers) linked in a system, devices with multiple processors, special purpose devices, devices with various peripherals and input and output devices, software acting as a computer or server, and combinations of the above.

The contents of following publications are hereby incorporated by reference as if set forth herein in their entirety:
 a. Saurabh Chakravarty, Raja Venkata Satya Phanindra Chava, and Edward A. Fox. Dialog Acts Classification for Question-Answer Corpora. In Proceedings of the Third Workshop on Automated Semantic Analysis of Information in Legal Text (ASAIL 2019), part of the 19th International Conference on Artificial Intelligence and Law (ICAIL 2019), 10 pages, Jun. 21, 2019, Montreal, QC, Canada.
 b. Saurabh Chakravarty, Maanav Mehrotra, Raja Venkata Satya Phanindra Chava, Han Liu, Matthew Krivansky, Edward A. Fox. Improving the Processing of Question Answer Based Legal Documents. In Proc. Legal Knowledge and Information Systems: JURIX 2019: The Thirty-second Annual Conference, Madrid, Spain, Dec. 11-13, 2019. Vol. 322, 10 pages, IOS Press.

These and any other publications or patents cited in this specification are cited to disclose and describe the methods and/or materials in connection with which the publications are cited. All such publications and patents are herein incorporated by reference as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant specification should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of computer science and the like, which are within the skill of the art. Such techniques are explained fully in the literature.

FIG. 1 is example of a networked environment 100 for generating declarative segments from documents containing questions and answers. The networked environment 100 can include a computing environment 105 and one or more client devices 110 in communication via a network 115. The computing environment 105 can include a data store 120 and a processing service 125. The processing service 125 can include a parsing application 130, an anonymizing application 135, a classifying application 140, and a transforming application 145, each of which is described in further detail below.

The computing environment 105 can be embodied as a computer, computing device, or computing system. In certain examples, the computing environment 105 can include one or more computing devices arranged, for example, in one or more server or computer banks. The computing device or devices can be located at a single installation site or distributed among different geographical locations. As further described below, the computing environment 105 can include a plurality of computing devices that together embody a hosted computing resource, a grid computing resource, or other distributed computing arrangement. In some cases, the computing environment 105 can be embodied as an elastic computing resource where an allotted capacity of processing, network, storage, or other computing-related resources varies over time. The computing environment 105 can also include or correspond to one or more virtualized server instances that are created in order to execute the functionality described herein.

The computing environment 105 can also be embodied, in part, as various functional (e.g., computer-readable instruction), logic (e.g., device, circuit, or processing circuit), or functional and logic elements that can be executed by the computing environment 105 to direct the computing environment 105 to perform aspects of the examples described herein.

The parsing application 130 can parse the contents of a question-answer document into question-answer groups and store those question-answer groups in a question-answer data structure. In some examples, the parsing application 130 can receive a question-answer document from, for example, the client device over the network 115 and store the question-answer document in the document data 150. In other examples, the question-answer document can be accessed directly from the document data 150 or other location in the network 115.

The question-answer document can include text representing a question-answer document, which can include a series of questions and answers. For example, the question-answer document can represent a transcript of a deposition. While the term "question-answer document" is used here to describe the data processed by the parsing application 130, the data being processed can be in a file (e.g., CSV), data structure (e.g., JSON or tabular), or database (e.g., set of tables, object store), so these terms are used interchangeably in the present disclosure, as can be appreciated.

Question-answer documents can be stored in a wide variety of file formats like .pdf, .docx, .rtf, .txt, .ocr, .csv, and other suitable formats as can be appreciated. So, the parsing application 130 can use a generalized technique to easily parse question-answer documents across all formats in a generalized way. For example, if the question-answer document is in the form of a file, the parsing application 130 can load a file reader based on the file extension.

The parsing application 130 can read the raw content of the question-answer document to determine whether the raw content of the question-answer document is in a multi-column format. The parsing application 130 can load a multi-column parser if the question-answer document is in a multi-column format. On the other hand, the parsing application 130 can load a single-column format if the question-answer document is not in a multi-column format.

The parsing application 130 can identify questions and answers in the question-answer document. The parsing application 130 can add these question-answer groups into a question-answer data structure and store the data structure in the document data 150.

The anonymizing application 135 can anonymize the contents of question-answer groups. In some examples, the question-answer groups can be parsed from a question-answer document by the parsing application 130. Anonymization can be used to keep confidential personally identifiable information (PII) present in question-answer documents. For example, while the public dataset was open access, the legal deposition data set included PI that should be kept confidential for privacy and legal reasons. Accordingly, there is a need to anonymize or obfuscate the PI present in depositions or other question-answer documents.

In some examples, the anonymizing application 135 can anonymize instances of personally identifiable information (PII) present in the question-answer groups passed from a question-answer document to prevent disclosure of confidential information that may be present in the question-answer document. While the term "personally-identifiable information (PII)" is used in the discussion below in reference to anonymizing information fields, the term "personally-identifiable information (PII)" can mean any personally-identifiable information, confidential information, private information, or any information capable of being anonymized, as can be appreciated.

For example, the parsing applicant can anonymize the following kinds of PI as part of handling confidential information:
1. Addresses
2. Ages
3. Dates
4. E-mail IDs
5. Locations
6. Names of individuals
7. Names of organizations
8. Phone numbers Other kinds of PI can also be anonymized as can be appreciated.

The anonymizing application 135 can use the question-answer groups generated by the parsing application 130 with Named Entity Recognition (NER) methods to identify the different kinds of PI fields. These PI fields may be present in the metadata of the question-answer document as well as in the corresponding question-answer groups.

In some examples, the replacement information can have the form <Field-Type>Index. For example, if the city of "Blacksburg" occurs in the deposition, it can be assigned an identifier like "City1". The index values for each type can be recorded, and any recurrence of the same value can be assigned the same identifier throughout the deposition. Mappings can be kept of the alias for each actual entity value, allowing generation of the original document from an anonymized version. All the fields can use this convention for anonymization, except for the names of individuals, for which a different approach can be used.

The classifying application 140 can classify questions and answers in one or more question-answer groups as to dialog act. Given a question-answer group comprising a question and at least one answer, the classifying application 140 can classify the question into a question dialog act category or multiple question dialog act categories. The classifying application 140 can likewise classify the at least one answer into an answer dialog act category. In some examples where the at least one answer comprises two or more answers, the two or more answers can all be classified into a single answer dialog act category, can each be classified into separate answer dialog act category, can each be categorized into multiple answer dialog act categories, or any other combination of the two or more answers and answer dialog act categories as can be appreciated. Between two or more answers and one or more answer dialog act categories, there can be an injective mapping, a surjective mapping, a bijective mapping, or any other mapping as can be appreciated.

To identify dialog acts, the classifying application 140 can use different classifiers based on, for example, deep learning methods that have achieved state-of-the-art results in multiple other tasks. The classifying application 140 can also use simple classifiers that employ sentence embeddings followed by a fully connected neural network to check for efficacy of sentence embeddings like bidirectional encoder representations from transformers (BERT) in dialog act classification. The following describes examples of different classification methods used to classify the dialog acts.

As an example, the classifying application 140 can use a convolutional Neural Network (CNN) that can be used to capture the n-gram representation of a sentence using convolution. A window size provided as a parameter can be used to define the number of words to be included in the convolution filter. The convolution operator can capture a bi-gram representation.

The classifying application 140 can apply a CNN to learning a sentence representation. In some examples, a feed-forward neural network layer can be added in front of the representation layer to finally classify the dialog act for a given sentence. Tokens from a sentence can be transformed into word vectors using, for example, word2vec and fed into the network. This can be followed by the convolution and max-pooling operations. The final sentence can have a fixed size representation irrespective of sentence length. As the system trains, the network can learn a sentence embedding as part of this layer. This representation can be rich, since it captures the semantic and syntactic relations between the words.

As another example, the classifying application 140 can use bi-directional long short-term memory (LSTM) with an attention mechanism to capture important information contained in a sentence. It may not use any classical NLP system-based features. Even though a CNN can capture some semantic and syntactic dependencies between words using a larger feature map, it may struggle to capture the long-term dependencies between words if the sentences are long. LSTM-based network architectures are better equipped to capture these long-term dependencies since they can employ a recurrent model. The context of the initial words can make their way down the recurrent chain based on the activation of the initial words and their gradients, during the back-propagation phase.

The classifying application 140 can feed words into the network using their vector representation. The network can process the words in both directions. This can help the network learn the semantic information not only from the words in the past, but also from the words in the future. The output layers of both the directional LSTMs can be combined as one, using an element-wise sum. An attention layer can be added to this combined output, with coefficients for each output unit. These coefficients can act as the attention mechanism; attention priorities are learned by the system during the training phase. These coefficients can capture the relative importance of the terms in the input sentence. The word embeddings were also learned as part of the training; training data can be stored in training data 160. Dropout was applied to the embedding, LSTM, and penultimate layers. L2-norm based penalties were also applied as part of the regularization.

Further, the classifying application 140 can generate sentence embeddings of the questions and answers via a BERT pre-trained model. BERT can be fine-tuned to any NLP task by adding a layer on the top of this architecture which makes it suitable for the task. Its high-level architecture can consist of various components like embeddings and transformers.

The classifying application 140 can use the BERT reference architecture, with a feed-forward neural network layer added on top of BERT sentence embeddings. The aim is to classify text with length that varies from roughly a portion of one sentence to a large paragraph. Further, a single sentence classification, not a sentence pair classification, can be performed, as is typical with BERT.

The transforming application 145 can transform question-answer groups into declarative segments. Once a question-answer group is classified based on dialog act, the transforming application 145 can transform the question-answer group into a canonical or simple form.

The transforming application 145 can first remove noise in the text of the question-answer groups so that transformation of the question-answer groups can be performed more efficiently. In some examples, noise can be mostly present in the question text. Table 1 shows some sample questions with the noise that can be removed via pre-processing. Through analysis of examples, a dictionary was created of noisy sentences and words, along with some rules based on regular expressions, that the transforming application 145 can use to remove the noise.

TABLE 1

Questions, with the noisy text in bold.

So, you also indicated that Mr. Williams's injury might require intervention as we discussed already; is that correct?
Okay. And, the reduction that you spoke about earlier in the diagram, you said that reduction was closed, correct?
I see. So, did you think it was the bartender?

For some dialog acts, the question and answer text can comprise a well-formed sentence in the beginning and the end, respectively. This was observed for the question dialog acts [bin-d, wh-d] and answer dialog acts [y-d, n-d]. The first two examples in Table 2 show the question text having a well-formed sentence before the actual question. For the last two examples, the answers are in binary form in the beginning followed by a well-formed sentence.

TABLE 2

Questions and answers that include a well-formed sentence. Declarative parts shown in bold.

| Text | Dialog Act |
|---|---|
| And the damage that you showed earlier in the diagram, you said that damage was accidental? | Q: bin-d |
| And a fracture that runs through the whole arm joint is a pretty severe fracture. When was the examination done? | Q: wh-d |
| Yes. We sent out this to that operating company. | A: y-d |
| No. I did not read any depositions or I think the second part is kind of general, but I haven't read any depositions. | A: n-d |

To process the questions with the well-formed sentence, the transforming application 145 can break the question text into a simple sentence and the actual question. This yielded two question-answer groups from each question. The first question-answer group was the well-formed sentence with the answer dialog act of "y." The answer dialog act was chosen as "y" since the statement being made is always true. The second question-answer group included the actual question from the question text along with the answer text and dialog act.

To process the answers with the well-formed sentences, the transforming application 145 can remove the binary answers from the answer text and create a new question-answer group, with the answer text as the question and the answer dialog act as "y." The answer dialog act was chosen as "y" since the statement is made by the deponent and the process involves paraphrasing the answer without judging its veracity. Having new question-answer groups after the pre-processing can enable the next stage of transformation to use the custom methods for each dialog act without having to handle such complexities of the questions and answers.

In some examples, the transforming application 145 can transform question-answer groups using techniques in natural language processing (NLP). Common patterns associated with deposition question-answer groups have been observed, according to the different question and answer dialog acts.

For each such common pattern, the transforming application 145 can use NLP parsing techniques like chunking and chinking to create custom transformation rules to transform the text into a canonical form. Information from text can be extracted using chunking and chinking. These techniques can use regular expressions based on the part-of-speech (POS) tags, to create a parse tree from a given sentence. Chunking can refer to the process of extracting chunks from a sentence based on certain POS tag rules.

Using chunking, the transforming application 145 can get to specific parts of the parse trees that are of interest. These rules can also be based on POS tags and can be represented using simple regular expressions. Meaningful parts of a sentence can be extracted based on these rules. In some examples, a regex-based search pattern can be used to identify chunks. This can isolate a part of the sentence into a chunk. The words within this chunk can be rearranged and/or replaced based on different scenarios. The chunk can then be joined back to the original sentence from which the chunk was extracted. Chinking can refer to the process of defining what is not to be included in a chunk. A chunking process can create chunks, and chinking breaks up those chunks into more granular chunks using some rules that exclude parts out of the chunk.

In other examples, the transforming application 145 can use deep learning techniques to transform question-answer groups. In deep learning based transformation, the OpenNMT Toolkit can be used to train sentence transformers for the different combinations of dialog act. Since training data was hard to obtain, and since it was not clear if all of the combinations of dialog act would be conducive to Deep Learning based transformation, Deep Learning based methods were developed for the combinations of [bin, y], [bin, n], [bin, y-d], and [bin, n-d].

The transforming application 145 can build Deep Learning based transformation t into a prototype that can be used to evaluate the feasibility of using Deep Learning based methods. There are no known works in the area that have addressed the exact problem handled by the disclosed examples, so Deep Learning based models, as can be stored in model data 165, were investigated that could be applied to this task. This is a challenging problem since Deep Learning based models are dependent on a large number of training samples, that can be stored in training data 160, to learn something well. The challenge is even more serious with sequence-to-sequence based models, due to the large number of parameters in play in the encoder-decoder network. It is not desirable for the system just to memorize certain examples. Rather it is preferred for the system to learn how the question-answer group should be transformed, so the learned transformation algorithm would be sufficiently general.

The network 115 can store document data 150, database data 155, model data 165, training data 160, intermediate data 170, and dataset data 175, as well as other types, categories, or partitions of data. The document data 150 can store question-answer documents for processing by the processing service 125, as well as declarative segment documents that result from processing by the processing service 125. The database data 155 can store various mappings between different sets of data, such as a mapping between non-anonymized data and the anonymized representation of that data. The model data 165 can store various models used by the processing service 125 to process question-answer documents, such classifiers for classifying question-answer groups based on dialog act, models used for recognizing named entities in question-answer groups for anonymization, and models for transforming classified question-answer groups into declarative segments. The training data 160 can include data that can be used to train models such as those stored in the model data 165. The intermediate data 170 can store intermediate representations of text included in a question-answer document between various stages of processing by the processing service 125. Each of the document data 150, database data 155, model data 165, training data 160, and intermediate data 170, however, can store any other data as appropriate.

The dataset data 175 can include data used to validate results of various processes described herein. For example, the dataset data 175 can include a dataset of legal depositions. Classification experiments were performed on this dataset and results are described below. The legal deposition dataset comprises around 350 depositions. The format of these documents follows conventional legal deposition standards.

As another example, the dataset data 175 can include a public dataset comprising legal documents related to the settlement of court cases between US states and the seven major tobacco industry organizations, on willful actions of tobacco companies to sell tobacco products despite their knowledge of the harmful effects. It was launched in 2002 by the UCSF Library and Center for Knowledge Management to provide public access to the many legal documents related to that settlement. The dataset, available for download, continues to grow as litigation continues. Among the over 14 million available documents, there were over 20,000 deposition related documents including transcripts, exhibits, telephone records, etc. Over 2,000 of these are witness deposition transcripts. The depositions from this dataset in general were longer than in the legal deposition dataset.

The network 115 can include the Internet, intranets, extranets, wide area networks (WANs), local area networks (LANs), wired networks, wireless networks, cable networks, satellite networks, other suitable networks, or any combinations thereof. The computing environment 105 can communicate with other devices coupled to the network 115 using various data transfer protocols and systems interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof. The network 115 can include connections to any number and type of network hosts or devices, such as website servers, file servers, cloud computing resources, databases, data stores, or any other network or computing architectures.

The client device 110 is representative of one or more client devices. The client device 110 can be embodied as any computing device, processing circuit, or processor based device or system, including those embodied in the form of a desktop computer, a laptop computer, a personal digital assistant, a wearable computing device, a cellular telephone, a tablet computer, an augmented reality device, or a virtual reality device, among other example computing devices and systems. The client device 110 can include one or more subsystems and/or peripheral devices. For example, the peripheral devices may include one or more input devices, such as a keyboard, keypad, touch pad, touch screen, microphone, scanner, mouse, joystick, camera, one or more buttons, etc. The peripheral devices may also include a display, indicator lights, speakers, global navigation satellite system (GNSS) circuitry, accelerometer, or other components, depending upon the primary use of the client device 110.

The client device 110 can execute one or more applications such as the client application 180 and a client data store 185. In some examples, the client application 180 can access one or more question-answer documents from the client data store 185. These question-answer documents can be transmitted to the client device 110 via the network 115 or generated by the client application 180 and stored in the client data store 185. In some examples, a question-answer document can be generated by the client application 180 based on input from one or more input devices (not shown) communicably coupled to the client device 110. The client application 180 can access one or more question-answer documents from the client data store 185 and transfer the one or more question-answer documents to the computing environment 105 for processing.

Figure 2:
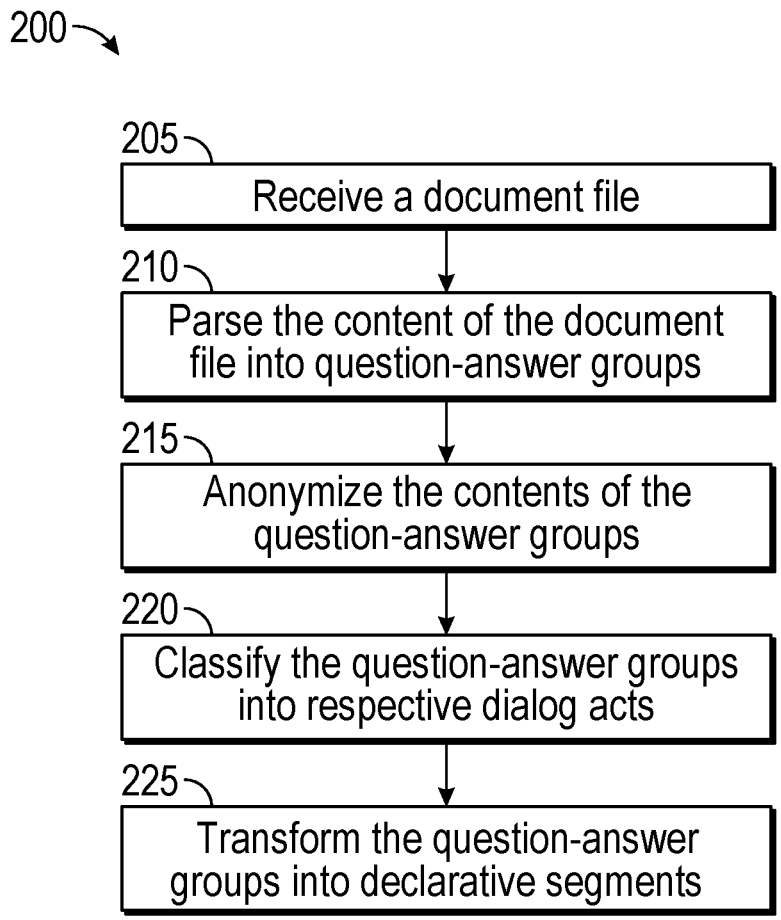
FIG. 2 shows a flowchart that provides one example of an operation of a portion of the document processing service involving a pipeline of processing question-answer documents, according to various embodiments of the present disclosure.

FIG. 2 shows a flowchart 200 that provides one example of an operation of a portion of the processing service 125 involving a pipeline of processing question-answer documents according to various embodiments. It is understood that the flowchart 200 of FIG. 2 provides merely an example of the many different types of functional arrangements that may be employed to implement the operation of the portion of document processing service 125 as described herein. As an alternative, the flowchart 200 of FIG. 2 may be viewed as depicting an example of elements of a method implemented in the computing environment 105 (FIG. 1) according to one or more embodiments. Each of steps 205, 210, 215, 220, and 225 will also be described in more detail below.

In step 205, a question-answer document can be received for processing. The question-answer document can contain one or more documents that include a series of questions and answers. The question-answer document can include text representing a question-answer document, which can include a series of questions and answers. The question-answer document can be in a file (e.g., .pdf, .docx, .rtf, .txt, .ocr, .csv), data structure (e.g., JSON, XML, tabular), or database (e.g., set of tables, object store), and other suitable formats as can be appreciated. In some examples, the question-answer document can be received from a user. In other examples, the question-answer document can be retrieved at runtime from the storage based on a document identifier given by a user.

In step 210, the content of the question-answer document can be parsed into question-answer groups according to the operation of a portion of the parsing application 130. The raw content of the question-answer document can be loaded into memory and parsed based on its format. Additional processing can be done to translate the raw content into question-answer groups, which can be stored in the intermediate data 170. The question-answer groups can comprise a data structure file such as a JSON file or an XML file.

In step 215, the content of the question-answer groups can be anonymized according to the operation of a portion of the anonymizing application 135. For example, any piece of personally identifiable information in the question-answer groups can be identified as an unanonymized token and replaced with its respective anonymized token. The anonymized representation of the question-answer groups can be stored in intermediate data 170. A mapping from the unanonymized tokens to the anonymized tokens can also be stored in intermediate data 170 or in database data 155.

In step 220, the anonymized question-answer groups can be classified as to dialog act type according to the operation of a portion of the classifying application 140. A classification process can load a classifier with a highest classification accuracy from the model data 165 and classify each question and answer according to that classifier. The classified and anonymized representation of the question-answer groups can be stored in intermediate data 170.

In step 225, the question-answer groups can be transformed into declarative segments using their respective dialog act classifications according to the operation of a portion of the transforming application 145. Classifying the question-answer groups based on their respective dialog acts can facilitate a case-based handling of the question-answer groups through appropriate transformers, which can be accessed in the model data 165. The declarative segments can be stored in the document data 150 for direct use or downstream processing. This location in the data store 120 is specific to the given document and can be used by the system as the final output. Thereafter, the operation of the portion of the processing service 125 ends.

FIG. 3 shows an example of portions of a deposition transcript 300. While the example of FIG. 3 shows portions of a deposition, the concepts described herein can also apply to any suitable question-answer document. The deposition transcript 300 includes some front-matter, such as a cover, details of the court reporter, lists of people present, date-time details, and location, although other meta-information can be included in addition to or instead of this information. Likewise, deposition transcript 300 can also include a header 305 or footer 310 that can include information like the name of the person being deposed, name of the attorney, name of the client or party, name of the law firm, e-mail IDs, phone numbers, page numbers, information of a transcription service, or other information as can be appreciated.

A deposition transcript 300 can contain multiple segments within it (like "INDEX", "EXHIBITS", "APPEARANCES", "EXAMINATION", "STIPULATIONS", "CERTIFICATIONS", etc.). The examination segment 315 can be identified and extracted based on observed patterns that represent beginning and ending of the examination segment 315 segment, which may be consistent across depositions. For example, the beginning of the examination segment 315 can be indicated by a heading 320 that reads "EXAMINATION". In the examination segment 315, an examiner, such as an attorney, can pose a question 325 and a deponent, such as a witness, can give an answer 330 in reply. As another example, an ending of the examination segment 315 can be indicated through one or more statements 335 by such participants as a court reporter or videographer.

Questions and answer exchanged between one or more examiners and deponents can be included in an examination segment 315, which is the segment to be extracted from the deposition transcript 310.

Though there can be a standard format for different types of question-answer documents, parsing them is not straightforward. As one non-limiting example, several challenges may be encountered while parsing question-answer documents. Such challenges can include, for example:

1. Varying number of columns per page,
2. Header and footer elimination, and
3. Determining the starting and ending points of the actual deposition conversation within the entire document.

Generally, the PDF versions of legal depositions have multiple columns per page. Apache Tika—a cross-platform tool developed by the Apache Software Foundation that can be used to extract document metadata, along with content, over a multitude of file formats, using a single programming interface—can read multiple columns in a page separately by recognizing column separations which are encoded as extended ASCII codes. Hence, text from separate columns can be parsed in the correct sequence.

Still, the text contained in the examination segment 315 of the deposition transcript 300 may not be readable directly as a question-answer group. The text can have extraneous characters or other extraneous data beyond the question-answer groups that can be removed or separated from the question-answer groups before the question-answer groups are parsed. For example, each question and answer can have "Q." and "A." characters in front of it, respectively. Parsing the questions and answers from each line would include these characters. For example, the question 325 would be parsed as "5 Q. And that smoking doesn't bother you?", while the answer 330 would be parsed as "13 A. I think that's kind of extreme." Some processing can be performed to remove these characters. Some depositions contain line numbers or timestamps for every line, which can also be removed via various processing methods.

The text contained in the examination segment 315 of the deposition transcript 300 transcript can therefore be parsed line-by-line to extract questions and answers and discard any other extraneous data. In some examples, Apache Tika can be used to parse the text from the examination segment 315. In some examples, regular expressions (regex) can be used to search for a pattern within each line of the text. Each line can be converted to a string which contains only alphabetics, periods, and question marks. Then, a dictionary can be used to store all the patterns and the list of indices of the lines in which those patterns had appeared. Finally, checks can be made for patterns satisfying one or more separation constraints, and lines including patterns meeting the one or more separation constraints can be removed. For example, lines can be removed from the text parsed from the examination segment 315 if those lines do not begin with the answer or question tags ('A.' and 'Q.') and do not end with a question mark. As another example, lines that include particular patterns can be removed from the text parsed from the examination segment 315 if those lines were removed when the number of times these patterns appear is greater than or equal to the number of pages of the deposition transcript 300.

After removing extraneous data from the text parsed from the examination segment 315, further processing can be done to extract the relevant data in the appropriate format. The parsed question-answer groups can be converted into a data structure.

Figure 4:
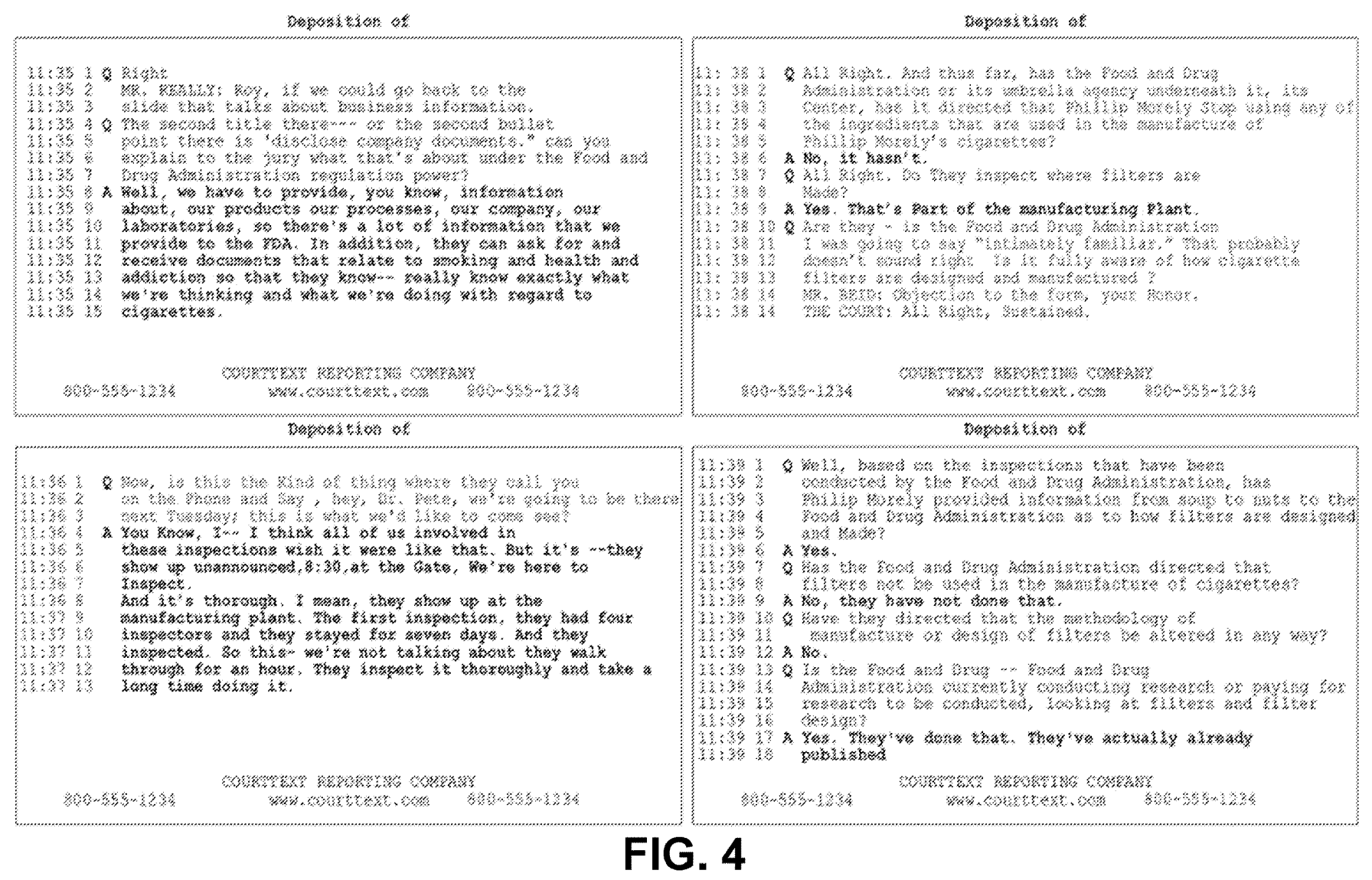

FIG. 4 shows an example of a page from aversion of a deposition with four original pages consolidated into a condensed page 400. While the example of FIG. 4 shows portions of a deposition transcript, the concepts described herein can also apply to any suitable question-answer document. Shown is a single condensed page 400 that includes what in an uncompressed version would be 4 pages, which in order are given as 405, 410, 415, and 420.

In some examples, a content detection and analysis framework can, such as Apache Tika, can handle these compressed forms of depositions. Apache Tika, and the Python library tika can be used to parse the condensed page 400. The Apache Tika library execution environment can be hosted by a Java runtime on the computing environment 105. The Tika server can be hosted by the local Java runtime in order to access the functionality of Apache Tika. To implement Tika on the computing environment 105, the .jar file of Apache Tika can be downloaded. This .jar file can be loaded by the Java runtime and accessed by the Python tika library. Also, a few environment variables can be set for this to work. They can include, but are not limited to, the following. The environment variable TIKA PATH can point to the folder containing the tika server .jar file. This directory works well with administrative permissions for the runtime. For the environment variable TIKA SERVER ENDPOINT, the runtime can be hosted on the local machine, e.g., set to localhost. The environment variable TIKA CLIENT ONLY can defines the mode of the runtime. In some examples, this may be hosted as in a REST client mode, not a REST server.

Figure 5:
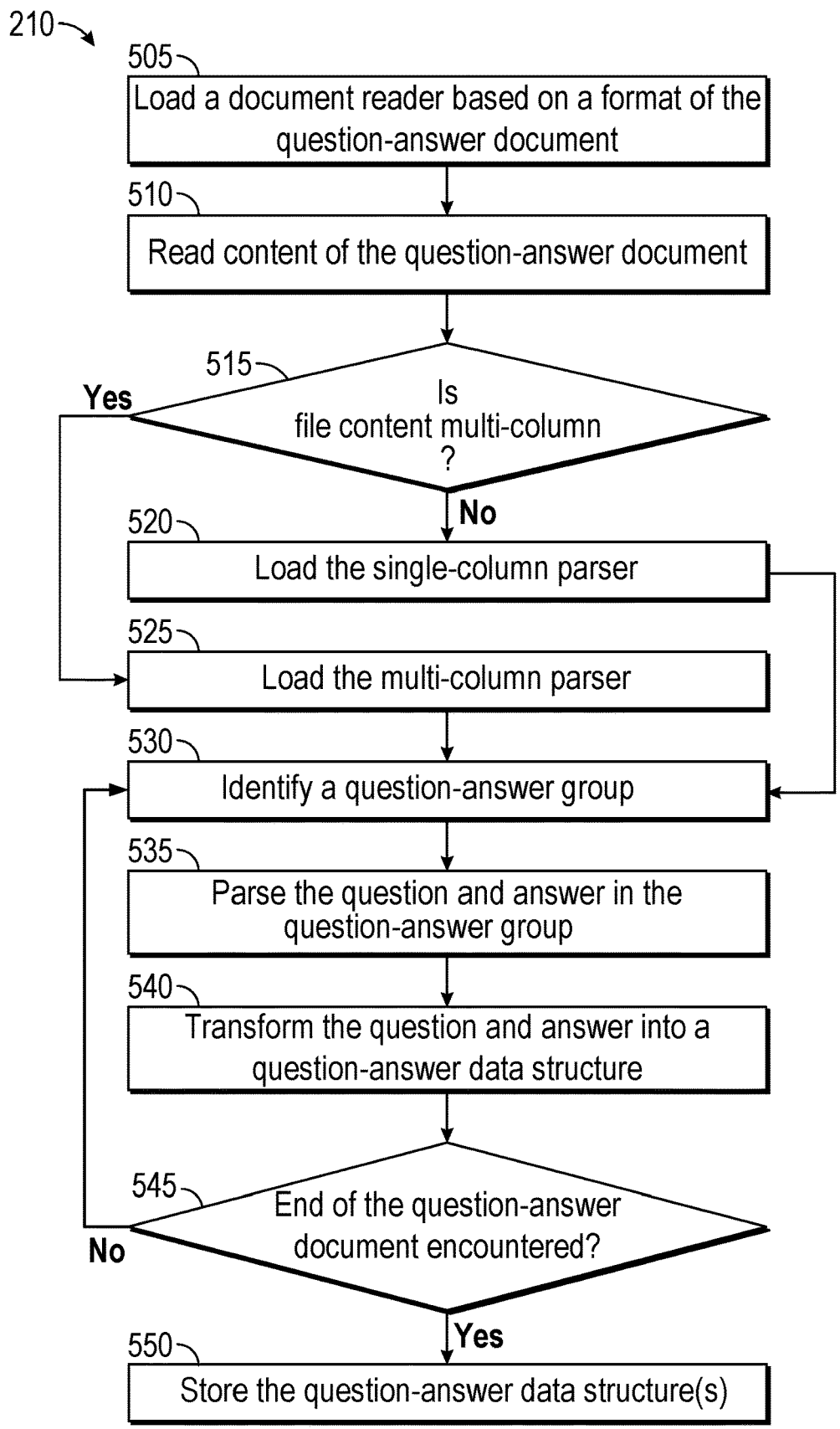
FIG. 5 shows a flowchart that provides one example of an operation of a portion of the parsing application involving parsing content of a file into question-answer groups, according to various embodiments of the present disclosure.

FIG. 5 shows a flowchart that provides one example of an operation of a portion of the parsing application 130 involving parsing content of a file into question-answer groups as shown in step 210 of FIG. 2 according to various embodiments. It is understood that the flowchart 210 of FIG. 5 provides merely an example of the many different types of functional arrangements that may be employed to implement the operation of the portion of the parsing application 130 as described herein. As an alternative, the flowchart 210 of FIG. 5 may be viewed as depicting an example of elements of a method implemented in the computing environment 120 (FIG. 1) according to one or more embodiments.

In step 505, the parsing application 130 can load a document reader based on a format of the question-answer document given by the user. For example, if the question-answer document is in the form of a file, the parsing application 130 can load a file reader based on the file extension. For example, an appropriate Apache file reader can be loaded based on the file extension, and the Apache Tika file reader can be loaded for files that are in multiple file formats.

In step 510, the parsing application 130 can read the raw content of the question-answer document. This content can be loaded in memory and some basic validation can be done to ensure that the content is in a readable format.

In step 515, the parsing application 130 can determine whether the raw content of the question-answer document is in a multi-column format. If the raw content of the question-answer document is not in a multi-column format but is in a single-column format, the parsing application moves to step 520 and loads the single-column parser. If the raw content of the question-answer document is in a multi-column format, the parsing application 130 moves to step 525 and loads the multi-column parser. Following the completion of either step 520 or step 525, the parsing application 130 moves to step 530.

In step 530, the parsing application 130 can identify a question-answer group in the question-answer document. The question-answer group can comprise a group of one or more questions and one or more corresponding answers (referred to herein as simply "question" and "answer" for simplicity). A question can span one or more lines until an answer is encountered, and the answer can span one or more lines until another question is encountered. In some examples, the parsing application can identify questions and answers based on tags preceding those questions and answers. For example, a question can begin with the letter 'Q', while an answer can begin with the letter 'A'.

At step 535, the parsing application 130 can extract the text of the question and answer from the question-answer group.

In step 540, the parsing application 130 can add the question-answer group to a question-answer data structure. These can be stored as groups, and in some examples, there can be multiple of question-answer groups that are retrieved after this step. For example, the parsing application can transform the question and answer into a JSON structure, which can be stored in a JSON file.

In step 545, the parsing application 130 can continue parsing to determine whether an end of the question-answer document has been encountered, which can mean that there is no remaining content to be parsed, and the parsing application can move to step 550. Otherwise, the parsing application can move back to step 530.

In step 550, the parsing application 130 can store the question-answer data structure generated at step 540 in the intermediate data 170. Depending on how many question-answer groups were identified in the question-answer document, the question-answer data structure may represent one or more question-answer groups. Thereafter, the operation of the portion of the parsing application 130 ends.

FIG. 6 shows an example of a page 600 of a deposition transcript that after parsing can yield question-answer groups as shown in FIG. 7 and then a question-answer data structure as shown in FIG. 8. The page 600 of the deposition transcript can include an examination portion 605 that can include one or more questions, answers, or speaker utterances, as well as line numbers or other meta-information. The page 600 of the deposition transcript can also include information such as the page number 610, the person deposed and the deposition date 615, the reporter that transcribed the deposition 620, and a URL 625 at which the deposition transcript can be accessed.

FIG. 7 shows an example of question-answer groups parsed from the examination portion 605 in the page 600 of the deposition transcript shown in FIG. 6. In this example, extraneous information such as the page number 610, person deposed and deposition date 615, reporter 620, and access URL 625 as shown in FIG. 6 have been removed. In addition, the line numbers have been removed from the examination portion 605, leaving only the question-answer text.

FIG. 8 shows an example of a question-answer data structure 800 generated from the question-answer groups of FIG. 7. Groups of questions and answers are given for one or more examiners, e.g., attorneys. Thus, for a first examiner, a first group begins with the question 810. A later answer is shown in 815. There could be utterances by other examiners and the examiner is identified in such a case as a 'speaker' along with what they spoke, as in 820. However, all the examiner utterances in 800 are presumed to be of the first examiner as in 805, unless the speaker's name is present and is different from the first examiner.

Figure 9:
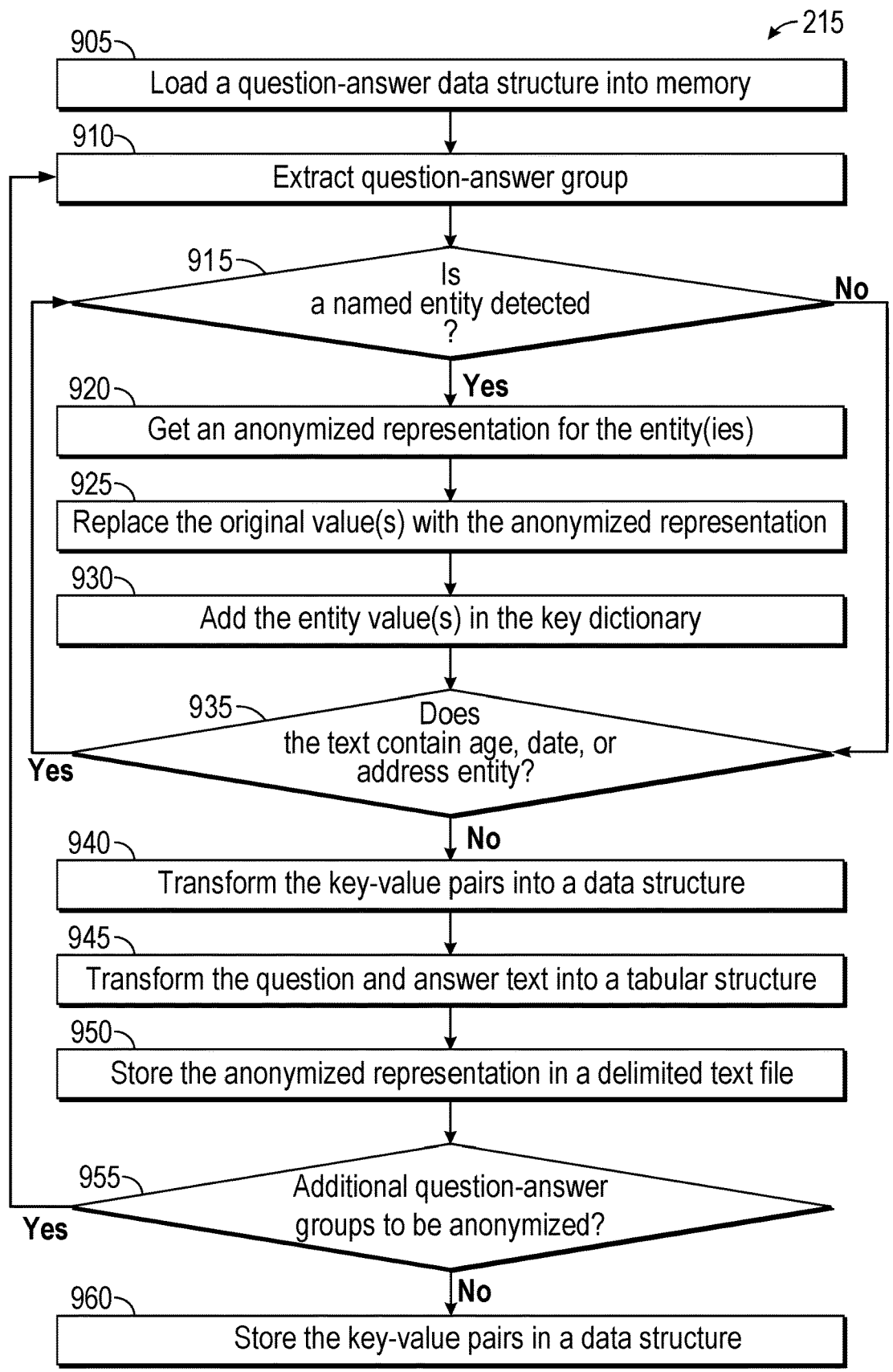
FIG. 9 shows a flowchart that provides one example of an operation of a portion of the anonymizing application involving anonymizing the contents of the question-answer group text, according to various embodiments of the present disclosure.

FIG. 9 shows a flowchart that provides one example of an operation of a portion of the anonymizing application 135 involving anonymizing the contents of the question-answer group text as shown in step 215 of FIG. 2 according to various embodiments. It is understood that the flowchart of FIG. 9 provides merely an example of the many different types of functional arrangements that may be employed to implement the operation of the portion of the anonymizing application 135 as described herein. As an alternative, the flowchart of FIG. 9 may be viewed as depicting an example of elements of a method implemented in the computing environment 105 (FIG. 1) according to one or more embodiments.

In step 905, the anonymizing application 135 can load a question-answer data structure into memory. The question-answer data structure can represent one or more question-answer groups. In some examples, the anonymizing application 135 can access the question-answer data structure from the intermediate data 170.

In step 910, the anonymizing application 135 can parse the data structure and extract a question-answer group.

In step 915, the anonymizing application 135 can determine whether a named entity was detected in the question-answer group by processing the text through named entity recognition. The natural language processing (NLP) technique of Named Entity Recognition (NER) can be used to identify the different kinds of PI in the depositions, as listed above. NER methods can tag the named entities in text based on the language structure. NER libraries like Stanford NLP and spaCy have been developed using large language corpora like Penn Treebank and have very good accuracy in tagging named entities in written and spoken text. spaCy can be used primarily, but for instances of locations and companies, Stanford NLP can be used along with spaCy—spaCy may incorrectly tag location and company names in some cases, and Stanford NLP was more accurate in tagging those entities. The purpose of using both spaCy and Stanford NER is to find the overlap in the results of both the frameworks and eliminate any misclassifications. If the text contains a named entity, the anonymizing application 135 moves to step 920. If no named entity is detected, the anonymizing application 135 moves to step 935.

In step 920, the anonymizing application 135 can process the text content for each detected entity type and generate an anonymized representation for it.

In step 925, the anonymizing application 135 can replace the text content for the detected entity type with the generated anonymized representation.

In step 930, the anonymizing application 135 can generate a mapping between the original content of detected entity type and its anonymized representation as a key-value pair. The mapping can be stored in database data 155.

In step 935, the anonymizing application 135 can process the question and answer text further for the presence of age, date, or address. If the evaluation returns false, the anonymizing application 135 moves to step 950. If the evaluation returns true, then the anonymizing application 135 moves to step 925.

In step 940, the anonymizing application 135 can transform the anonymized key-value pairs into a data structure. For example, the anonymizing application 135 can transform the anonymized key-value pairs into a data structure such as a JSON structure.

In step 945, the anonymizing application 135 can transform the list of anonymized question-answer groups into a tabular data structure.

In step 950, the anonymizing application 135 can store the anonymized representation of the question-answer group in the intermediate data 170. The anonymized representation of the question-answer groups can be stored in a delimited text file such as a comma-separated value (CSV) file.

In step 955, the anonymizing application 135 can determine whether the question-answer data structure includes any additional question-answer groups to be anonymized. If the anonymizing application 135 determines that the question-answer data structure includes additional question-answer groups to be anonymized, the anonymizing application 135 can move back to step 910. If the anonymizing application 135 determines that question-answer data structure does not include additional question-answer groups to be anonymized, the anonymizing application 135 can move to step 960.

In step 960, the anonymizing application 135 can store the anonymized representation of the key-value pairs in the intermediate data 170. Thereafter, the operation of the portion of the anonymizing application 135 ends.

FIG. 10 shows an example of a table 1000 showing anonymization methods for a representative set of entity types, along with examples for each method with pre-anonymization and post-anonymization character strings. The first column gives the entity type 1010, with an entry for several different types of PII. The second column gives the corresponding anonymization method 1020. An example of that method is shown by way of the pre-anonymization form 1030 followed by the resulting post-anonymization form 1040. Thus, each of the rows of table 1000 summarizes handling for one type of PII.

FIG. 11 shows an example of regular expressions for recognizing two types of personal information, namely phone numbers and e-mail identifiers, as part of anonymization processing. Phone numbers and e-mail addresses can be identified using regular expressions. Regular expressions were developed that could give wide coverage on the different types of phone number and e-mail address formats. The top portion 1110 can represent a regular expression that can be used to extract phone numbers. Phone numbers can be represented in several different formats. All the patterns found in which a phone number can be represented were taken into consideration; this led to a general regular expression to detect the phone numbers in a string. These phone numbers can also be anonymized similarly. The bottom portion 1120 can represent the regular expression developed to extract e-mail IDs. They can then be anonymized and each anonymized mapping is added to the dictionary where mappings are tracked.

FIG. 12 shows an example of anonymization of persons, locations, and organizations by the anonymizing application 135, showing a sentence 1210, its tokenized and tagged representation 1220, and the resulting anonymized sentence 1230. In some examples, the anonymizing application 135 can use a 3-class model of Stanford NER and spaCy, which can be stored in model data 165, for recognizing persons, locations, and organizations. The anonymizing application 135 can use functionality from spaCy and Stanford NER to tokenize a sentence. Each token can be tagged using the 3-class model with either 'PERSON', 'LOCATION', 'ORGANIZATION', or 'O'. The anonymizing application 135 can use spaCy and Stanford NER to identify location and organization entities and tag them with 'LOCATION' and 'ORGANIZATION', respectively. The anonymizing application 135 can tag other entities with 'O', which can represent non-named entities. The anonymizing application 135 can generate a tokenized and tagged representation 1220 of the sentence 1210 based on the tokenized words and tagged entities. The tokenized and tagged representation 1220 can comprise a list of tuples, with each tuple comprising an entity and its tag. This list of tuples can be converted into a dictionary. The anonymizing application 135 can anonymize the location and organization entities in the tagged representation 1220 by replacing each of these entities with an anonymized representation, which the anonymizing application 135 can use to generate the anonymized sentence 1230.

FIG. 13 shows an example of anonymization for address information, showing a sentence 1310, its tokenized and tagged representation 1320, and the resulting anonymized sentence 1330. While a location can be recognized as a named entity, an address may not be considered a named entity. For example, named entity recognition may simply identify an address as a collection of locations. For example, for the address "118E, 16th Street, Rolla, Missouri, 64501", named entity recognition can classify "Rolla" and "Missouri" as locations that can be anonymized while the remaining portions of the address remain unanonymized. But it is helpful for the complete address to be anonymized using a separate address category.

For example, to identify addresses, the anonymizing application 135 can employ an integration of spaCy and usaddress, the latter of which is a Python library for parsing unstructured address strings into address components using advanced NLP methods. The anonymizing application 135 can use the parse method in usaddress to tokenize the address string and label each token using an address label. Address labels can include, for example, AddressNumber, StreetName, StreetNamePostType, PlaceName, StateName, or other suitable label as can be appreciated. A label such as, for example, Recipient, can be used for tokens that are not part of an address. Then the address labeled tokens can be combined to yield an anonymized sentence 1330. Checks can be made to verify if any token in the address string is classified as location (GPE) by spaCy and to anonymize the address.

Figure 14:
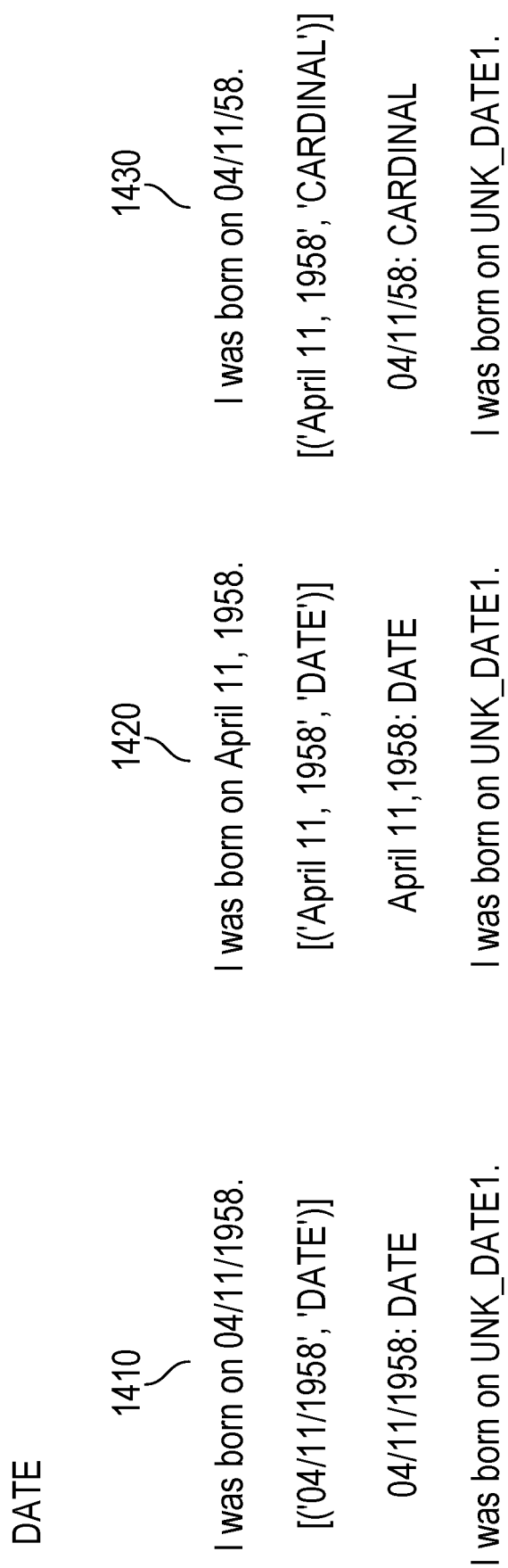
FIG. 14 shows an example of anonymization for date information, showing a set of regular expressions for elements of dates, three different but equivalent sentences, and for each sentence: the entity extracted, the entity with its type, and the resulting anonymized sentence, according to various embodiments of the present disclosure.

FIG. 14 show examples of three different but equivalent sentences, and for each sentence, the entity extracted, the entity with its type, and the resulting anonymized sentence. A date can be represented in several formats. It can be numerical like 04/17/2019 or it can be a mix of alphabetics and numbers like "April of 2019". In some examples, all representations of dates can be anonymized, including less-specific representations such as years like "2019".

Dates can be identified using a combination of spaCy and the dateutil parser. If any token in the sentence is labeled "DATE", it can be parsed using the dateutil parser. If the dateutil parser is successfully able to convert it into a datetime object, then that can be anonymized. But spaCy was not able to identify some tokens which are in an odd format like "4/11/58." Similarly, the dateutil parser does not work well on the entire string when it also contains other entities.

Thus, regular expressions can be used to identify dates in any numerical format within a sentence, except the text format where months or days are mentioned as text like "Jan. 1, 2017". Regular expressions can work as a second pass if spaCy is unable to identify one or more date entities. These regular expressions can be used to detect patterns in which dates are commonly expressed.

For example, regular expressions for a month or months can be:

```
MONTH = "|".join(["January", "February", "March", "April", "May", "June", "July",
    "August", "September", "October", "November", "December"])
MONTH = "(" + MONTH + ")"
```

Dates that include a name of a month can be recognized using:

```
DATE_REGEX=re.compile(MONTH+"\s(\d{1,2}),\s
    (\d{4})")
```

And dates that include numbers and slashes can be recognized using:

```
DATE_REGEX_1=re.compile("[0-9]{1,2}/[0-9]{1,
    2}/[0-9]{2,4}")
```

Similar regular expressions can be used to recognized numbered dates that include other delimiters such as hyphens. Years can be recognized using:

```
YEAR_REGEX=re.compile(r"([1-2][0-9]{3}")|
```

The actual-to-anonymized date entity mappings can then be added to the dictionary, similar to the processing done with the location, organization, phone number, and e-mail ID entities.

The first example 1410 shows a sentence that includes a date in a number-and-slash format. The entity "04/11/1958" can be extracted from the sentence using a regular expression and identified as a date entity. The date entity can then be replaced in the sentence with an anonymized representation.

The second example 1420 shows a sentence with a date that includes a month name. The entity "Apr. 11, 1958" can be extracted from the sentence using a regular expression and identified as a date entity. The date entity can then be replaced in the sentence with an anonymized representation.

The third example 1430 shows a sentence that includes a date in a number-and-slash format. The entity "4/11/58" can be extracted from the sentence using a regular expression and identified as a cardinal entity. The cardinal entity can then be replaced in the sentence with an anonymized representation.

FIG. 15 shows an example of a list of three steps for anonymization of individual names, with examples of the replacement of names by anonymized names. The names of individuals can pose a special challenge during anonymization. An individual may sometimes be addressed with their full name such as "John Smith", but at other times they may be addressed as "Mr. Smith" or just "John". Because of this inconsistency in addressing an individual, the exact identity of the individual can be resolved first.

A different methodology can therefore be used to anonymize names, as is illustrated in the example of FIG. 15. Instead of employing techniques that were used for other fields, a pseudonym or a generated full name for the individual can be assigned and used to replace all references to the name (fullname, firstname, lastname) with an anonymized name as per the pseudonym.

In some examples, the first anonymization can be of all the entities other than the names of individuals, so the text before processing for anonymization of individual person names can have only PERSON named entities remaining.

Thus, the PERSON named entities can be extracted from the text. This begins by iterating over the keys "examiner", "continuing_examiner", and "speaker" to extract the names of all those people. Considering the format of parsed depositions, it may be the case that few keys in the parsed dictionary are just the names of the speakers—those are often named entities to be anonymized. These names may only be the first names or last names of the speakers.

The "question", "answer", and "spoke" key values can be iterated through to extract the named entities from these text sentences. Like with locations and organizations, in some examples both spaCy and Stanford NER can be used to extract the entities with PERSON as the NER label. Three separate sets can be maintained which store first names from the extracted PERSON named entities, last names from the extracted "PERSON" named entities, and extracted speaker names.

Anonymized names can be generated for each first and last name separately. In some examples, faker, a Python library which can be used to generate faked data, can be used to generate anonymized names for each first and last name separately. First and last names can be treated separately because using aliases like PERSON1, SPEAKER1, or WITNESS1, as can done for other entities, may not be advisable for individual person names. In question-answer documents, a person can be addressed based on either last name or full name. So, when a person is addressed differently it may not be possible to replace the names accurately if first names and last names are not aliased separately. The anonymized names being generated are such that both first name and last name can be aliased separately, which eliminates the problem.

Along those lines, shown in FIG. 15 are several examples of replacement of PERSON entities with anonymized names. In example 1505, several names—both first names and last names—are shown with their corresponding anonymized representations. While "Neil Simmons" can appear to be aliased "Jamie Phillips", internally Neil and Simmons are aliased separately into Jamie and Phillips, as illustrated in example 1505. Example 1510 shows first name and last name combinations and their anonymized representations. In this example, when Neil Simmons is addressed as Mr. Neil Simmons, it is anonymized as Mr. Jamie Phillips. And in example 1515, last names are shown with their anonymized representations. Here, when Neil Simmons is addressed as Mr. Simmons, it is anonymized as Mr. Phillips. But if PERSON1 were used as an alias for Neil Simmons, it would be difficult and confusing to anonymize that person when he is addressed in different ways, as mentioned above.

FIG. 16 shows an example of an explanation of three constraints related to anonymization of ages, along with two example question-answer groups, and processing steps for their anonymization. In some cases, anonymizing age entities is more complicated. Challenges in this regard are explained in FIG. 16. The complexity is because, unlike organization, name, date, or location, age is not a named entity, and unlike phone numbers or e-mail IDs, it is difficult to develop regular expressions to extract them. Age is just a number. So, to identify an age entity, it helps to understand the language of the question-answer group, extract the keywords and labels of tokens from the question-answer group, and then make the best guess as to what number might possibly be an age entity.

To avoid bad guesses and ensure accuracy, several constraints and conditions to identify age entities can be implemented. One constraint can be to determine the lemmatization keywords which possibly indicate that there is an age entity in the question or answer text. The keywords selected in this case are "age" and "old" 1605.

Age detection can involve a two-step process. First, the question and answer can be processed separately to check if there are any of these keywords in the lemmatized text. The spaCy NER can be used to lemmatize the tokens. If any of the tokens' lemma is one of the keywords, the dependency subtree of those keywords can be extracted using spaCy. Then POS tagging can be performed for all of the tokens in that subtree and the tokens which have a POS tag as "NUM" can be identified. This token is an age entity of that question or answer text. But this approach alone may not identify all of the age entities.

The age entity in the question-answer group 1610 and 1615 can be identified because lemmatization of question and answer text separately indicates the presence of an age entity, 1620. Regarding 1625 and 1630, lemmatization of the answer alone may not indicate the age entity. In this case, the question-answer group can be processed together. This can use an entirely different approach. There may not be a lemmatized token which matches the keyword, so there may not be a dependency subtree which would allow checking a token with the "NUM" POS tag in the question or answer text. Checking of "NUM" POS tags in the entire text can be misleading since the questions or answers can have numbers, which are not actual ages. So, lemmatized keywords can be sought in the question text. If the question text does not have required keywords, the processing can be concluded, since the age entities, if there are any, can be identified by processing them separately, and the question-answer group need not be processed together. But if the required keyword is found in the question, then the answer can possibly have an age entity which is not identified when processed alone. To determine the age entity in the answer, NER can be applied to the answer text, and DATE and CARDINAL labels are sought within the text. If they are found, the entity type and POS tag of each token can be extracted. A subsequent search on the type and POS tag combination can then be done for each token and then a check can be made for the desired pattern in the answer text which indicates the presence of an age entity. Then the DATE and CARDINAL entities can be extracted from the answer text. Next a check can be made for several conditions and patterns for the extracted DATE and CARDINAL entities. If any of these conditions are satisfied, this entity is an age entity.

A first check can be if the POS tag of the head of that entity is a VERB. If yes, then the children tokens of the head token can be extracted as are their lemma, POS tags, and syntactic dependencies by doing dependency parsing on the children tokens. Next, there can be a check for four different conditions:

1. If there is a pronoun in the set of lemmatized children tokens
2. If there is a proper noun in the POS tags of the children tokens
3. If there is a nominal subject in the syntactic dependencies of the children tokens
4. If the lemma of the head of the entity is "turn" to extract age from sentences like "Robert turns 33 this year".

If any of these conditions are satisfied, then the entity represents age.

A check can be made if the lemma tag of the head of an entity is a PRONOUN. If yes, then this entity can represent age. If the syntactic dependency of the entity is a ROOT, the entity can represent age. If the syntactic dependency of the entity is a conjunct and if the syntactic dependency of head of this entity is a ROOT, that entity can represent age. If the number of POS tags of the entire answer tokens is 1 and it is a NUM POS tag, the entity can represent age. Some of the complexity is summarized in 1635.

FIG. 17 shows examples of actual entity to anonymized entity mappings. Mappings of locations, organizations, phone number, and dates are given in the first set of mappings 1705. Mappings for individuals and organizations are given in the second set of mappings 1710. An evaluation of ten anonymized depositions, based on manual observation of the accuracy of the removal, separation, or extraction of identifying information, indicated that the anonymization process can have greater than 95% accuracy.

FIG. 18 shows a flowchart that provides one example of an operation of a portion of the classifying application 140 involving classifying the question-answer groups into their respective dialog acts as shown in step 220 of FIG. 2 according to various embodiments. It is understood that the flowchart of FIG. 18 provides merely an example of the many different types of functional arrangements that may be employed to implement the operation of the portion of the classifying application 140 as described herein. As an alternative, the flowchart of FIG. 18 may be viewed as depicting an example of elements of a method implemented in the computing environment 105 (FIG. 1) according to one or more embodiments.

In step 1805, the classifying application 140 can load a parsed and anonymized delimited text file into memory. The delimited text file can be, for example, a comma-separated values (CSV) file.

In step 1810, the classifying application 140 can process data in the delimited text file and extract the text of the question-answer groups into memory.

In step 1815, the classifying application 140 can perform pre-processing on the question-answer groups. This step can remove, separate, or extract noise from the text.

In step 1820, the classifying application 140 can load a classifier instance into memory. In some examples, the classifier instance can be a pre-trained model for a classifier, which can be accessed in model data 165.

In step 1825, the classifying application 140 can use the classifier instance in memory to classify the dialog acts of the question-answer groups. The classification can be done as per the defined ontology given in FIGS. 19, 20, and 21.

In step 1830, the classifying application 140 can store the classified question-answer groups in the intermediate data 170. Thereafter, the operation of the portion of classifying application 140 ends.

FIG. 19, in table 1900, shows an ontology of the different dialog acts that can be defined for the questions in the depositions. Category 1910 indicates the question dialog act type. Description 1920 explains the category. Example 1930 give one or more sentences that illustrate that category.

The "wh" category, described in its row (first) in table 1900, can include wh-questions starting with words like "who," "what," "when," "where," "why," and "how." The "wh" category can cover many of the dialog acts in a deposition, and so was expanded into sub-categories, illustrated in table 2000. This can enable specific comprehension techniques to be used on each sub-category as the sentences are varied for each of the sub-categories.

The "wh-d" category, described in the second row in table 1900, can include wh-declarative questions. Wh-declarative questions can start with words like "who," "what," "when," "where," "why," and "how" and include more than one statement.

The "bin" category, described in the third row in table 1900, can include binary questions. Binary questions can be answered affirmatively or negatively with, for example, "yes" or "no."

The "bin-d" category, described in the fourth row in table 1900, can include binary-declarative questions. Binary-declarative questions can be answered affirmatively or negatively and can be used for verification of an answer when the answer is in fact known.

The "qo" category, described in the fifth row in table 1900, can include open questions. Open questions can be questions that are general and not specific to a context.

The "or" category, described in the sixth row in table 1900, can include choice questions. Choice questions can offer a choice among several options as an answer.

FIG. 20, in table 2000, lists and describes examples of sub-categories 2010 for the "wh" parent category described in table 2000. Description 2020 explains the sub-category. Example 2030 gives a sentence that illustrates that sub-category. The "num" sub-category can include numerical questions. Numerical questions can be wh-questions that are specific to numeric quantities. The "hum" sub-category can include human-specific questions. Human specific questions can include wh-questions that are specific to one or more human beings and information concerning one or more human beings. The "loc" sub-category can include location questions. Location questions can include wh-questions specific to one or more locations. The "ent" sub-category can include entity questions. Entity questions can include wh-questions that can be specific to one or more other entities. The "des" sub-category can include descriptive questions. Descriptive questions can include wh-questions that can be answered with a description of a person, place, thing, or event as can be appreciated.

FIG. 21, in table 2100, shows examples of different dialog acts defined for answers in question-answer documents. For each dialog act, category 2110 gives a category of answer dialog act. Description 2120 explains the category. Example 2130 gives one or more sentences that illustrate that category. The "y" category can include yes answers. Yes answers can include affirmative answers to questions. The "y-d" category can include yes-declarative answers. Yes-declarative answers can include affirmative answers that include an explanation for the answer. The "y-followup" category can include yes-followup answers. Yes-followup answers can include affirmative answers to questions that include another question relating to the question asked. The "n" category can include no answers. No answers can include negative answers to questions. The "n-d" category can include negative answers that include an explanation for the answer. The "n-followup" category can include no-followup answers. No-followup answers can include negative answers to questions that include another question relating to the question asked. The "sno" category can include non-opinion answers. Non-opinion answers can include statements that are not opinion and can be informative. The "so" category can include opinion answers. Opinion answers can include statements that are opinion rather than factual. The "ack" category can include acknowledgement answers. Acknowledgement answers can include answers that acknowledge a question or statement. The "dno" category can include unknown answers. Unknown answers can include answers that are given when an answer to the question asked is unknown. The "confront" category can include confrontational answers. Confrontational answers can include answers that do not include information and are a confrontation to the question asked.

Figure 22:
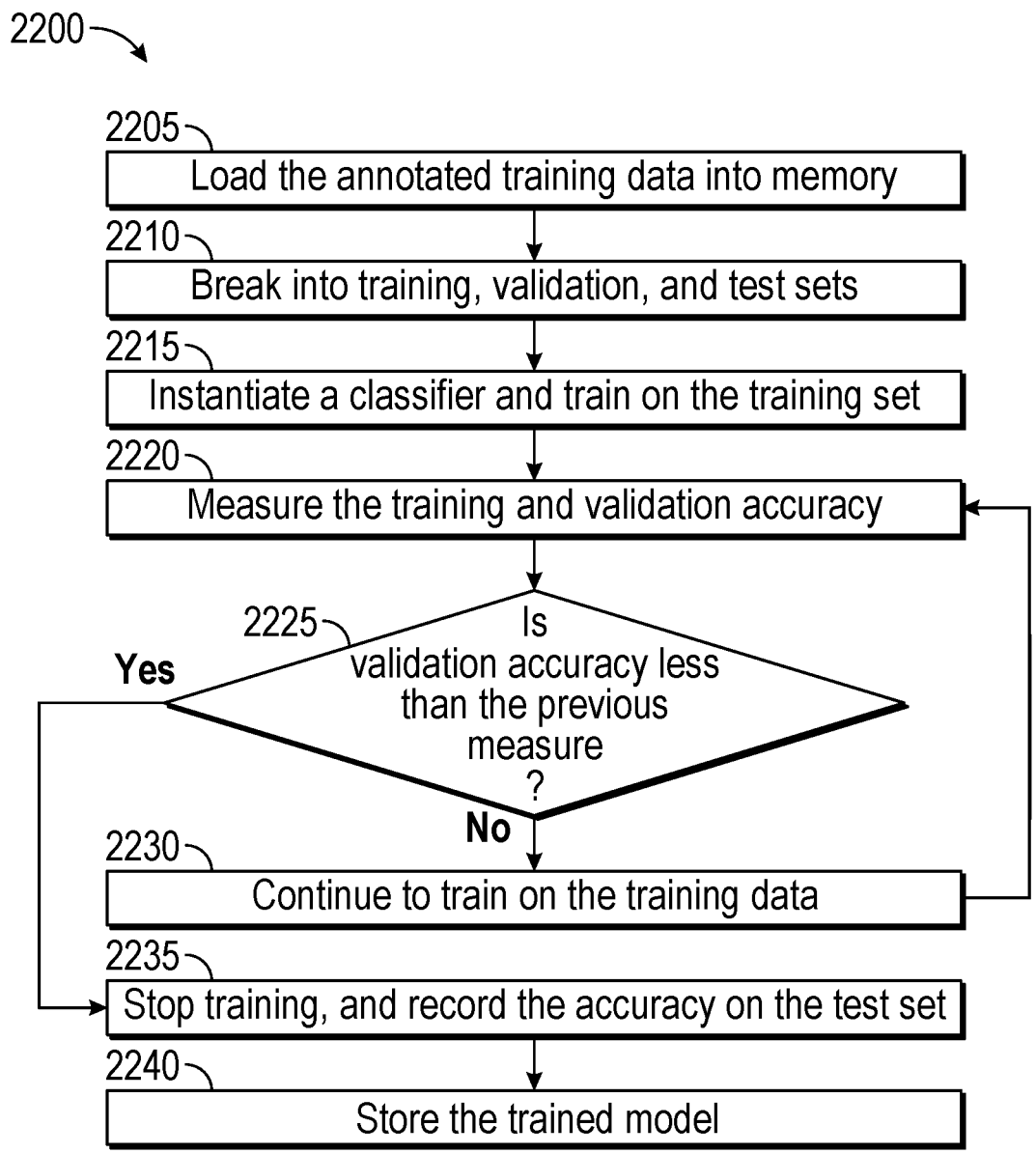
FIG. 22 shows an example of a flow diagram of the steps for training a classifier, according to various embodiments of the present disclosure.

FIG. 22 shows a flowchart 2200 that provides one example of an operation of a portion of the classifying application 140 involving training suitable classifiers for classifying questions and answers as to dialog act according to various embodiments. It is understood that the flowchart 2200 of FIG. 22 provides merely an example of the many different types of functional arrangements that may be employed to implement the operation of the portion of the classifying application 140 as described herein. As an alternative, the flowchart 2200 of FIG. 22 may be viewed as depicting an example of elements of a method implemented in the computing environment 105 (FIG. 1) according to one or more embodiments.

In step 2205, the classifying application 140 can load annotated training data from training data 160 into memory to begin training the different classifiers.

In step 2210, the classifying application 140 can break annotated data into three sets of training, validation, and test the three sets in a proportion of 70, 20, and 10 percent, respectively.

In step 2215, the classifying application 140 can instantiate a new instance of a classifier and train it on the annotated training data. The classifier can be trained for a given number of iterations on the training data.

In step 2220, the classifying application 140 can measure the training and validation accuracy of the classifier. In some examples, the classifying application 140 can take this measurement once the training has been run for a given number of iterations.

In step 2225, the classifying application 140 can evaluate validation accuracy and can determine whether it is less than a previously measured validation accuracy. If the evaluation returns false, the classifying application 140 moves to step 2230. In some examples, the classifying application can also move to step 2230 if there is no previously measured validation accuracy. If the evaluation returns true, the classifying application 140 moves to step 2235.

In step 2230, the classifying application 140 can continue to train the classifier. The classifier can be trained for a certain number of iterations again. The classifying application 140 can then move back to step 2220.

In step 2235, the classifying application 140 can stop the training process and the accuracy can be measured on a test set.

In step 2240, the classifying application 140 can store the trained model in model data 165. Thereafter, the training operation of classifying application 140 ends.

Figure 23:
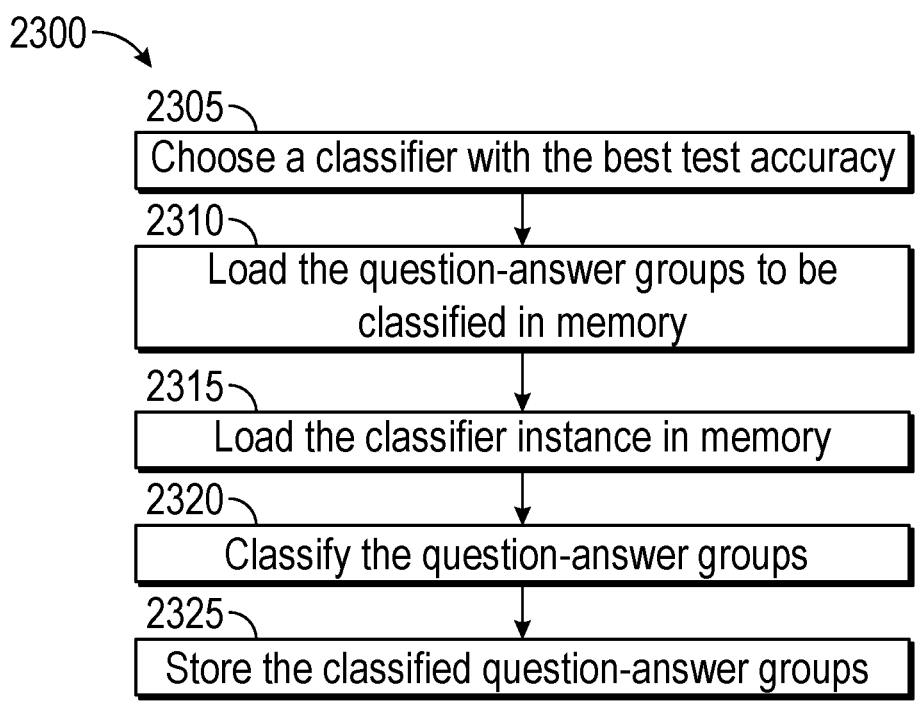
FIG. 23 shows an example of a flow diagram of the steps for loading a classifier and using it to classify data, according to various embodiments of the present disclosure.

FIG. 23 shows a flowchart 2300 that provides one example of an operation of a portion of the classifying application 140 involving using classifiers when processing a deposition according to various embodiments. It is understood that the flowchart 2300 of FIG. 23 provides merely an example of the many different types of functional arrangements that may be employed to implement the operation of the portion of the classifying application 140 as described herein. As an alternative, the flowchart 2300 of FIG. 23 may be viewed as depicting an example of elements of a method implemented in the computing environment 105 (FIG. 1) according to one or more embodiments.

In step 2305, the classifying application 140 can choose a classifier with a best accuracy. In some examples this accuracy can be the accuracy recorded at step 2235 of FIG. 22. The classifier can be loaded from the model data 165.

In step 2310, the classifying application 140 can load the question-answer groups to be classified from the intermediate data 170.

In step 2315, the classifying application 140 can load the classifier instance into memory from model data 165 as stored as part of step 2240.

In step 2320, the classifying application 140 can classify the data and store the classified representation into memory.

In step 2325, the classifying application 140 can store the classification results in intermediate data 170. Thereafter, the operation of the portion of the classifying application 140 ends.

Figure 24A:
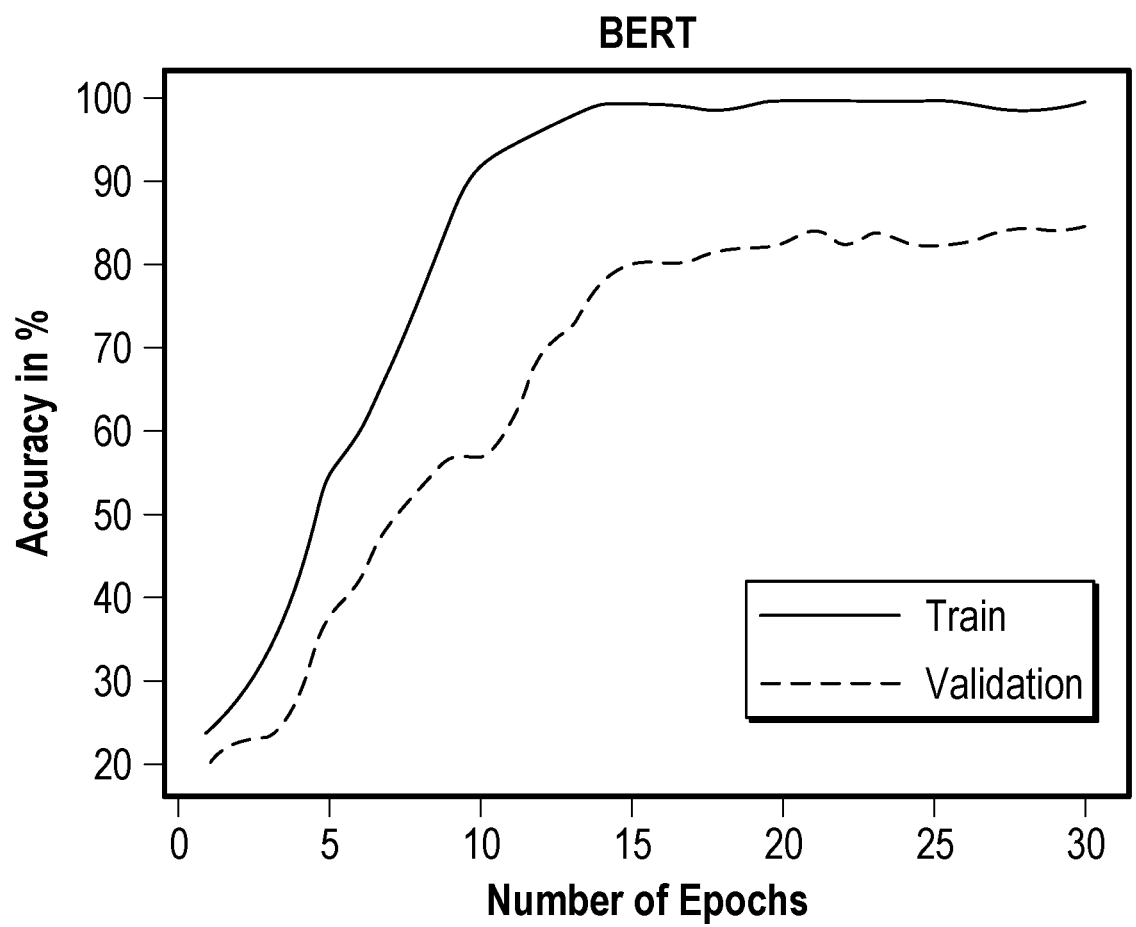
FIGS. 24A-C show examples of visualizations of the accuracy across epochs during training and testing, for each of three approaches to classifying dialog acts, according to various embodiments of the present disclosure.
Figure 24B:
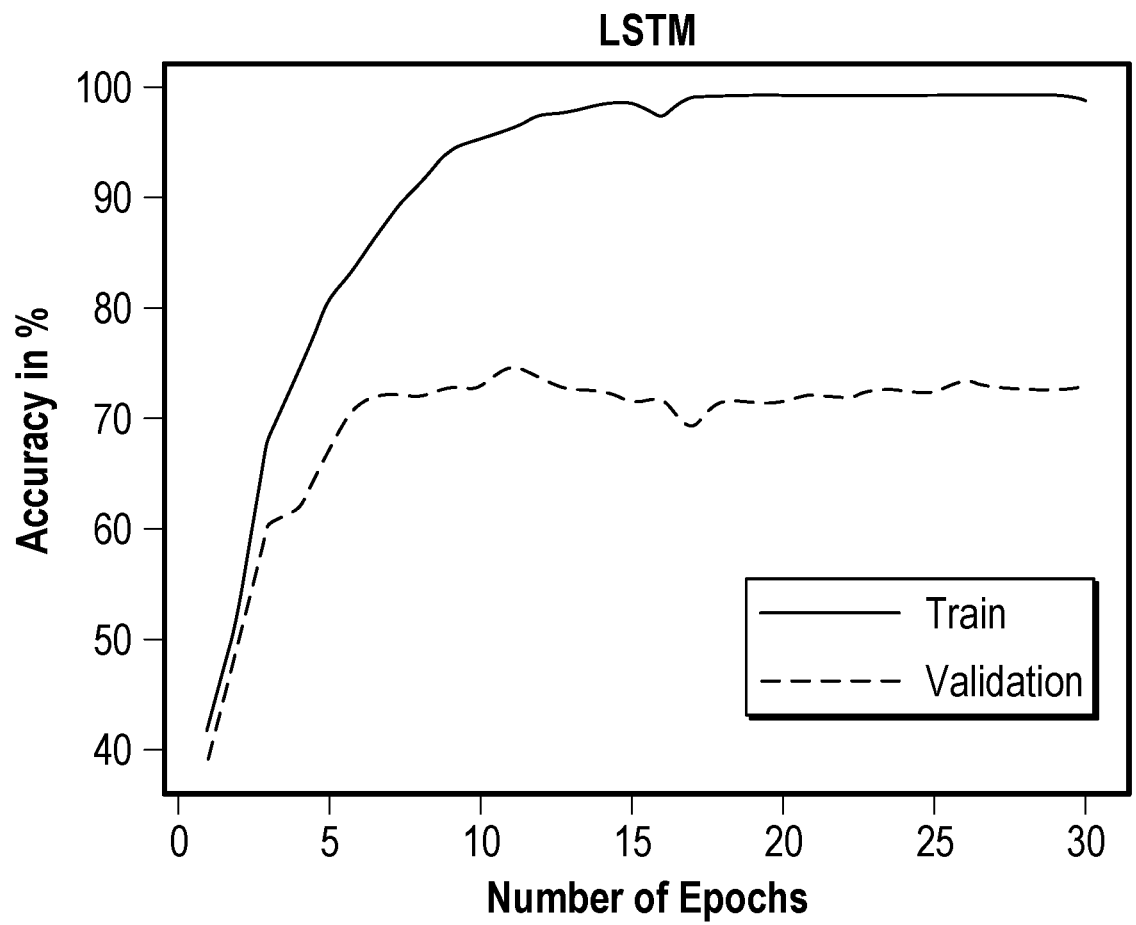
Figure 24C:
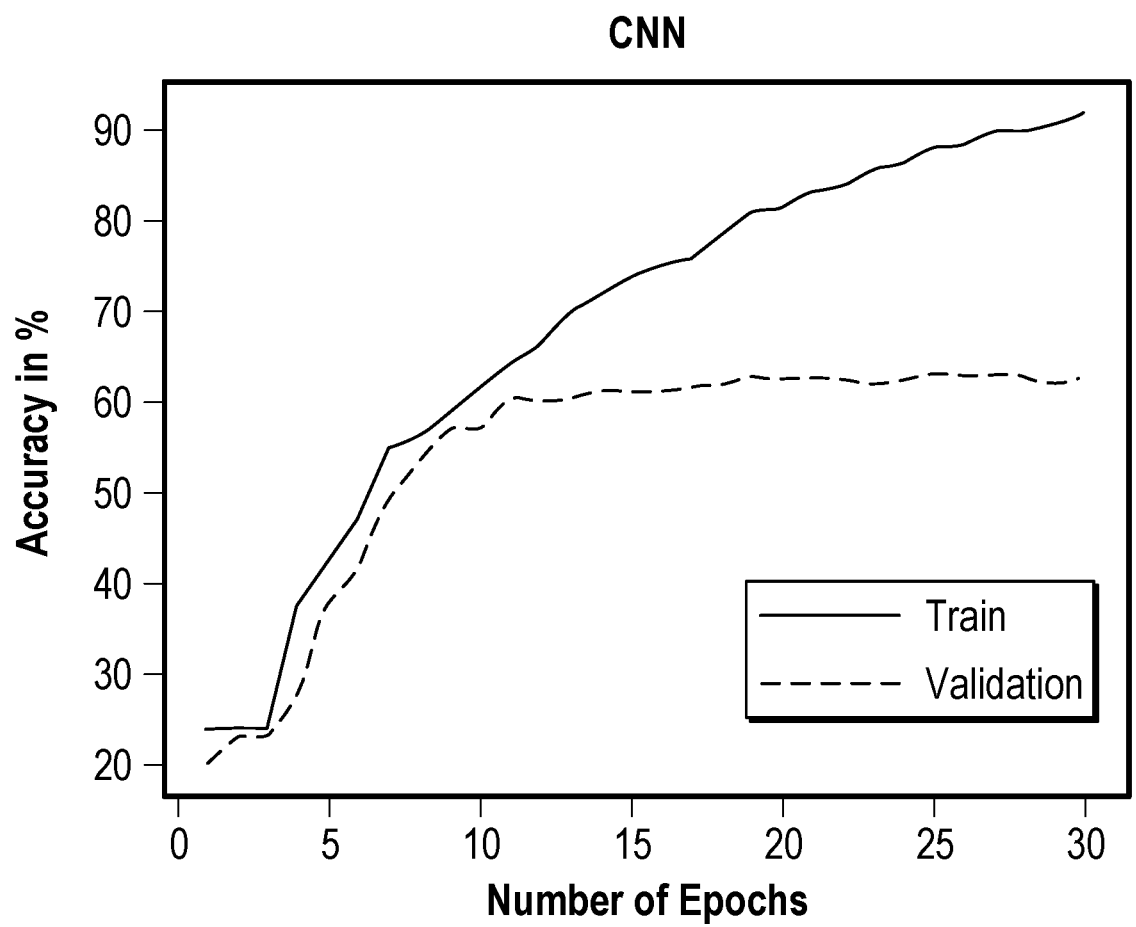

FIGS. 24A-C are examples of visualizations of accuracy across epochs during training and testing, for each of three approaches to classifying dialog acts for the legal deposition dataset. The accuracy for each of three classifiers is plotted: BERT in FIG. 24A, LSTM in FIG. 24B, and CNN in FIG. 24C. The same method for tuning can be used for the public dataset.

The overall size of the public dataset was a total of about 2500 questions and answers. The legal deposition dataset had about the same number of examples. These datasets were manually annotated by two graduate students, to provide a ground truth for evaluation. The dataset then was randomly divided into train, validation, and test datasets in the ratio 70:20:10, respectively, to be studied using each of the three classifiers. Each classifier was tuned specifically for a given dataset. Data used to train the classifiers can be stored in training data 160.

Three classifiers were used based on CNN, LSTM, and BERT, as described above. Multiple runs of training were performed for each of the classifiers to ascertain the best hyper-parameters based on the results on the validation dataset. The hyper-parameters for the three classifiers are described below. The test dataset was used to evaluate the performance for each of the classifiers. Precision, Recall, and F1 score were the measures in the evaluation.

When evaluated using the public dataset, BERT outperformed the other methods by a significant margin and achieved an F1 score of 0.84. CNN achieved only 0.57, while LSTM achieved 0.71. When evaluated using the legal deposition dataset, BERT outperformed the other methods by a significant margin and achieved an F1 score of 0.87. CNN achieved 0.71, while LSTM achieved 0.75.

Tables 3, 4, and 5 give the parameters of the CNN, LSTM, and BERT classifiers, respectively, with which the best results were achieved for the public dataset.

TABLE 3

Best fine-tuned parameters for CNN classifier for the public dataset

| Parameters | Values |
| --- | --- |
| hidden layer size | 200 |
| dropout | 0.5 |
| output layer activation function | sigmoid |
| n-gram | trigram |
| max-sequence length | 32 |
| batch-size | 100 |
| number of epochs | 30 |

TABLE 4

Best fine-tuned parameters for LSTM classifier for the public dataset

| Parameters | Values |
| --- | --- |
| hidden layer size | 128 |
| embedding size | 256 |
| learning rate | 0.01 |
| max-sequence length | 32 |
| batch-size | 100 |
| number of epochs | 30 |

TABLE 5

Best fine-tuned parameters for BERT classifier for the public dataset

| Parameters | Values |
| --- | --- |
| learning rate | 2e-5 |
| max-sequence length | 32 |
| batch-size | 100 |
| number of epochs | 30 |

Tables 6, 7, and 8 give the parameters of the CNN, LSTM, and BERT classifiers, respectively, with which the best results were achieved for the legal deposition dataset.

TABLE 6

Best fine-tuned parameters for CNN classifier for the legal deposition dataset

| Parameters | Values |
| --- | --- |
| hidden layer size | 100 |
| dropout | 0.1 |
| output layer activation function | sigmoid |
| n-gram | unigram |
| max-sequence length | 32 |
| batch-size | 100 |
| number of epochs | 30 |

TABLE 7

Best fine-tuned parameters for LSTM classifier for the legal deposition dataset

| Parameters | Values |
| --- | --- |
| hidden layer size | 64 |
| embedding size | 32 |
| learning rate | 0.01 |
| max-sequence length | 32 |
| batch-size | 100 |
| number of epochs | 30 |

TABLE 8

Best fine-tuned parameters for BERT classifier for the legal deposition

| Parameters | Values |
| --- | --- |
| learning rate | 0.0005 |
| max-sequence length | 32 |
| batch-size | 100 |
| number of epochs | 30 |

After 15 epochs, the training accuracy is still increasing but the validation accuracy remains almost constant. This indicates that after 15 epochs, the models achieve a good fit. The validation accuracy of BERT is highest compared to the CNN and LSTM classifiers, reaching around 83% after 21 epochs. This is another indicator that the BERT classifier can be best suited for dialog acts classification of legal depositions as compared to the CNN and LSTM classifiers.

Figure 25:
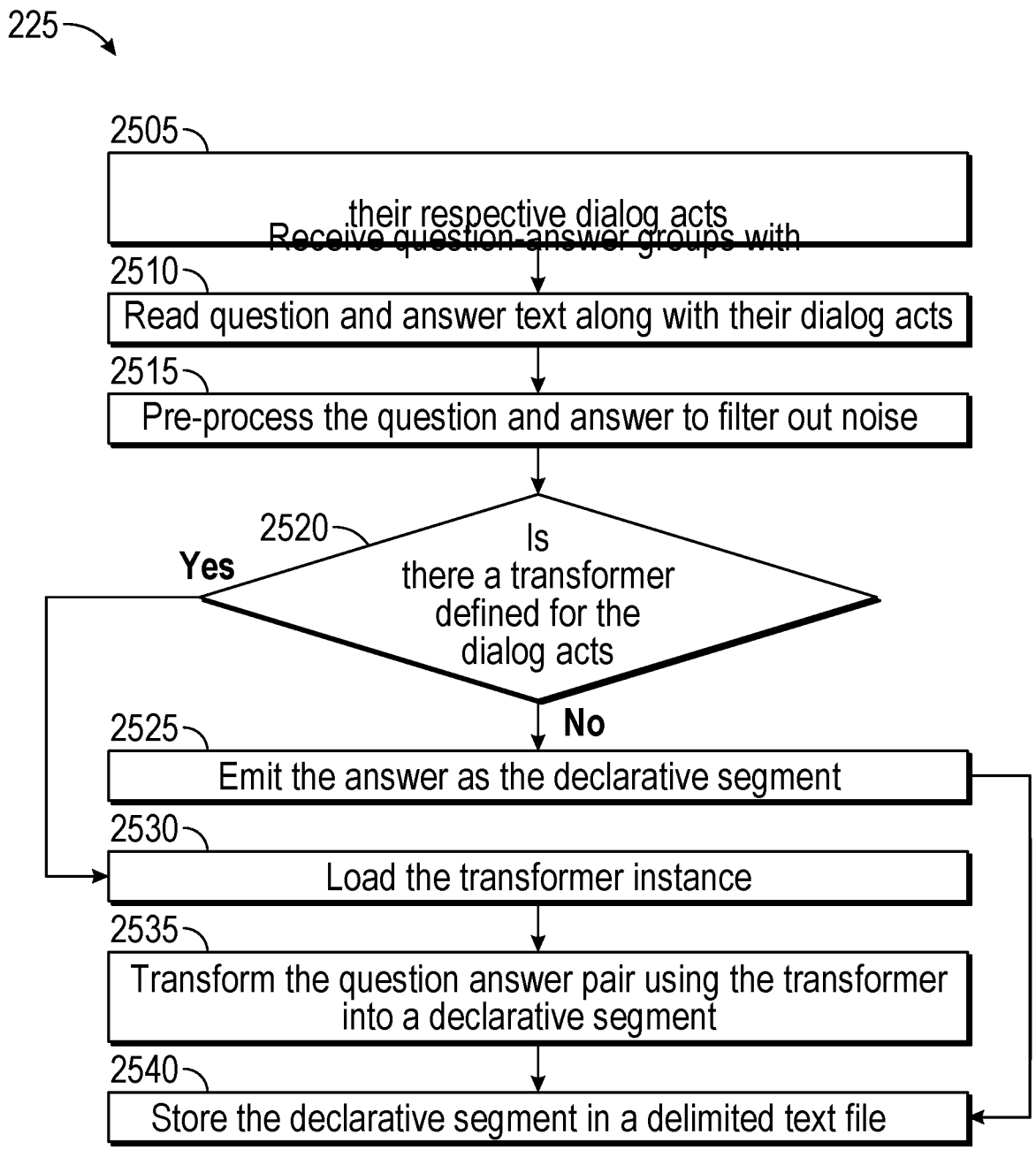
FIG. 25 shows an example of a flow diagram for transforming a question-answer group that has been classified as to dialog act into a declarative segment, according to various embodiments of the present disclosure.

FIG. 25 shows a flowchart that provides one example of an operation of a portion of the transforming application 145 involving transforming the question-answer groups into declarative segments using their respective dialog acts as shown in step 225 of FIG. 2 by applying a suitable transformer to operate on different types of question-answer groups according to various embodiments. It is understood that the flowchart 225 of FIG. 25 provides merely an example of the many different types of functional arrangements that may be employed to implement the operation of the portion of the transforming application 145 as described herein. As an alternative, the flowchart 225 of FIG. 25 may be viewed as depicting an example of elements of a method implemented in the computing environment 105 (FIG. 1) according to one or more embodiments.

In step 2505, the transforming application 145 can receive question-answer groups along with their respective dialog acts.

In step 2510, the transforming application 145 can load the question and answer text along with their dialog acts into memory from the intermediate data 170.

In step 2515, the transforming application 145 performs pre-processing on the question and answer text to remove noise, if it is present.

In step 2520, the transforming application 145 can evaluate whether a transformer is defined for the dialog act combination for a given question-answer group. If the result evaluates to true, the transforming application 145 moves to step 2530. Otherwise, the transforming application moves to step 2525.

In step 2525, the transforming application 145 can emit the answer text as the declarative segment.

In step 2530, the transforming application 145 can load a transformer instance into memory from the model data 165.

In step 2535, the transforming application 145 can transform the question and answer text into a declarative segment using the transformer instance.

In step 2540, the transforming application 145 can store the declarative segment into a file in intermediate data 170. Thereafter, the operation of the portion of the transforming application 145 ends.

FIG. 26 gives examples of question-answer groups and their corresponding declarative segments. For each question-answer group, the appropriate transformation result in the form of a declarative segment is given.

FIG. 27, in table 2700, shows an example question and answer, each with its respective dialog act, along with the desired canonical form, with the types given in 2710, as shown in the 3 rows of the body of table 2700. A goal is to transform each question-answer group into a canonical text, using the text present in the question and answer, as in 2720, and their corresponding dialog act 2730. Specific rules can be developed for each dialog act type group, to process its conversation question-answer group, and transform that into a suitable form for subsequent analysis. Given an automatic method to classify each dialog act in a conversation, an approximate divide-and-conquer solution for the transformation task can include applying the right transformer for each frequent type of dialog act group.

Figure 28:
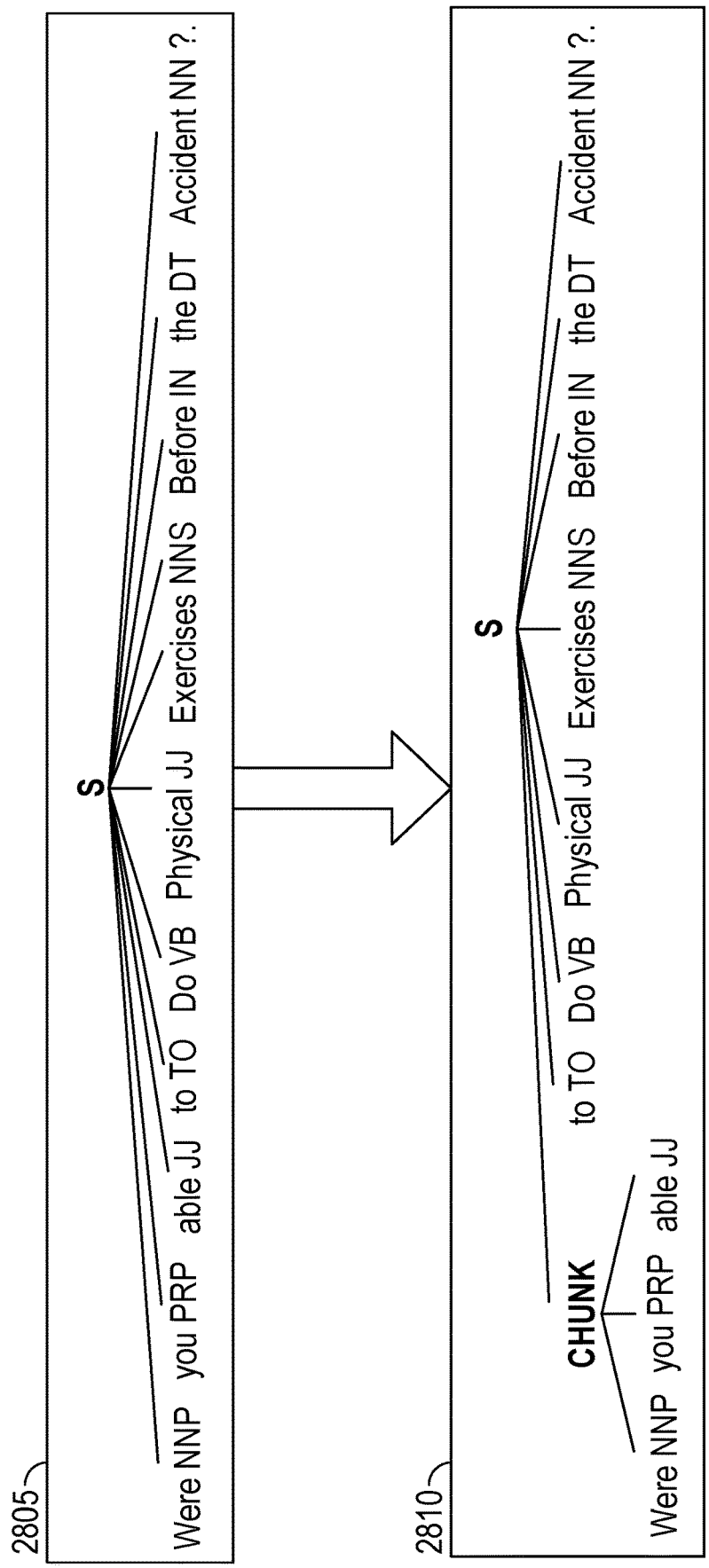
FIG. 28 shows an example of a question, represented as a parse tree, with each word tagged by its part-of-speech, and the transformed version that shows a chunk produced through natural language processing, according to various embodiments of the present disclosure.

FIG. 28 shows an example of a question, represented as a parse tree, with each word tagged by its part-of-speech, and the transformed version that shows a chunk produced through natural language processing, including chunking and chinking. Processing can begin with the question text and created a simple sentence tree 2805. Then sentence tree can be broken up into a chunked form 2810, with a chunk based on a rule of "<. *>?<PRP><.*>?." This rule specifies that any personal pronoun that has any POS tag before and after it can be extracted as a chunk. In this case, it extracted "Were" and "able" that were before and after the pronoun word.

For transformation to a canonical form, the identified chunk can be changed into a first-person description. This description can be from the perspective of the deponent. An example transformed sentence in this case could be "I was able to do physical exercises before the accident".

As an example, simple chunking rule can be based on a regular expression and can be used to extract the segment "Were you able" from the text and convert it into a tree. The positions of "were" and "you" in the tree were swapped, and transformations were made of "you" to "I" and "were" to "was." For each of these simple transformations of a question-answer group word to a canonical form word, an entry was made in a dictionary to keep track of the transformations. This dictionary was expanded to account for different transformations that were required for other words that needed to be transformed. The transformation was iteratively improved based on the results observed on the data. Specific methods were developed for each combination of a question and answer dialog act. Statistical techniques were used to identify the most prevalent POS patterns that could be used for chunking and transforming the tree within each identified chunk.

FIG. 29 shows an example of a table, showing for three groups of dialog act combinations, a set of regular expressions for chunks, along with a description of the rule for that regular expression. Specific regular expressions and rules are summarized in table 2900. There can be at least three broad groupings of dialog act combinations 2910. For each grouping a set of regular expression rules 2920 can be applied. Each of the rules has a description 2930.

Figure 30:
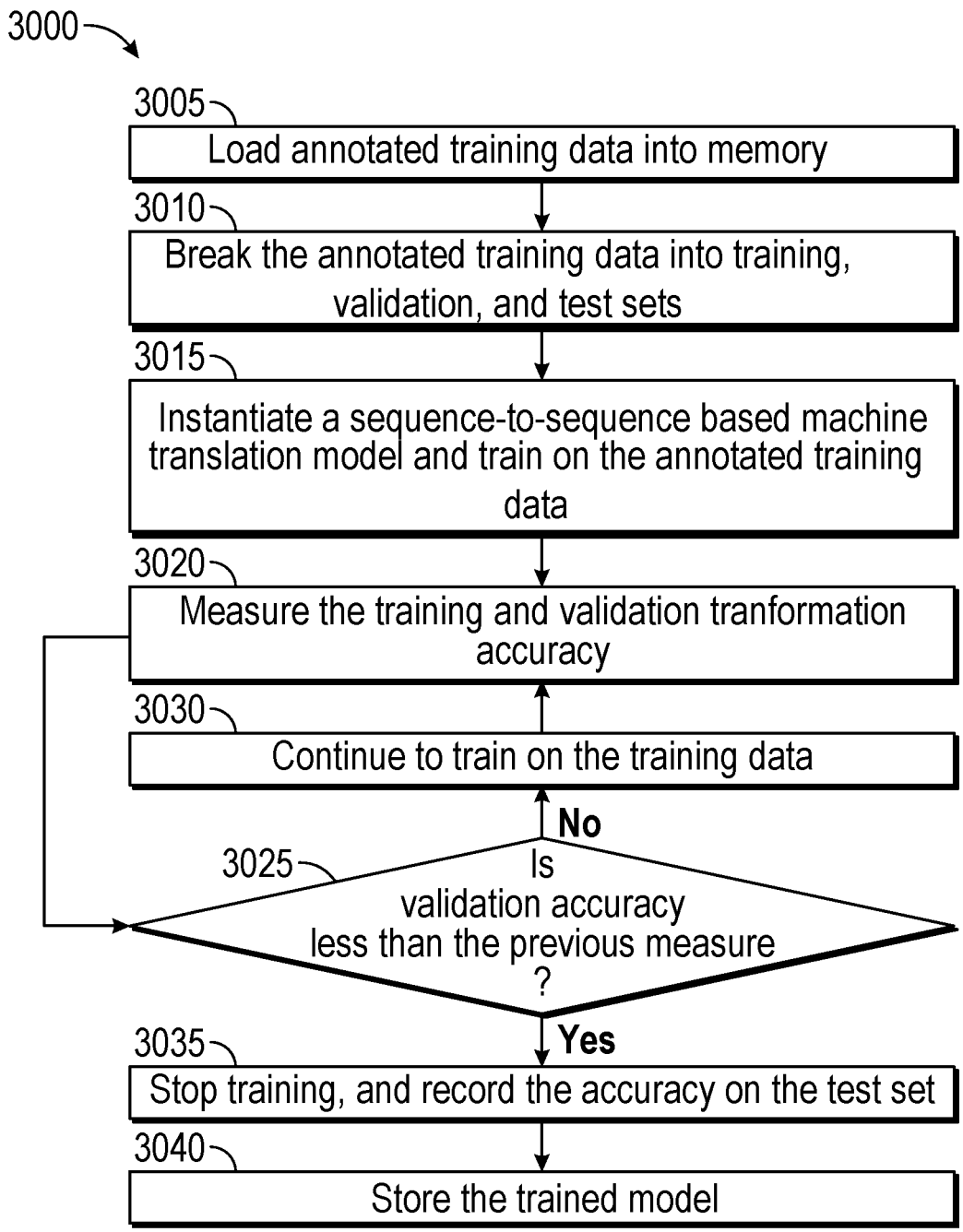
FIG. 30 shows an example of a flow chart for training a deep learning transformer for text strings, according to various embodiments of the present disclosure.

FIG. 30 shows a flowchart 3000 that provides one example of an operation of a portion of the transforming application 145 involving training transformer models, as can be stored in model data 165, for a deep learning approach to transforming text into a canonical form according to various embodiments. It is understood that the flowchart 3000 of FIG. 30 provides merely an example of the many different types of functional arrangements that may be employed to implement the operation of the portion of the transforming application 145 as described herein. As an alternative, the flowchart 3000 of FIG. 30 may be viewed as depicting an example of elements of a method implemented in the computing environment 105 (FIG. 1) according to one or more embodiments.

In step 3005, the transforming application 145 can load annotated training data from the training data 160 into memory.

In step 3010, the transforming application 145 can break the annotated training data into training, validation, and test sets in a proportion of 70, 20 and 10, respectively.

In step 3015, the transforming application 145 can instantiate a sequence-to-sequence based machine translation model, as can be accessed from model data 165, and train it on the annotated training data. The training data can include a plurality of tuples, where each tuple can include, for example, a question, an answer, and a declarative segment. The declarative segment can be a grammatically-correct and semantically-equivalent rewriting of the question and answer. The training operation can run for a certain number of iterations.

In step 3020, the transforming application 145 can measure the training and validation accuracy. The training and validation accuracy value can be recorded into memory.

In step 3025, the transforming application 145 can evaluate whether the validation accuracy is less than the previously recorded value. If the result evaluates to no, the transforming application 145 moves to step 3030. In some examples, the classifying application can also move to step 3030 if there is no previously measured validation accuracy. If the result evaluates to yes, the transforming application 145 moves to step 3035.

In step 3030, the transforming application 145 can continue to train the model, as can be stored in model data 165, for another round of training. This can involve the training operation running for a certain number of iterations.

In step 3035, the transforming application 145 can stop the training operation and measure the accuracy of the trained model on the test set.

In step 3040, the transforming application 145 can store the trained model into the model data 165. Thereafter, the training operation of the transforming application 145 ends.

Figure 31:
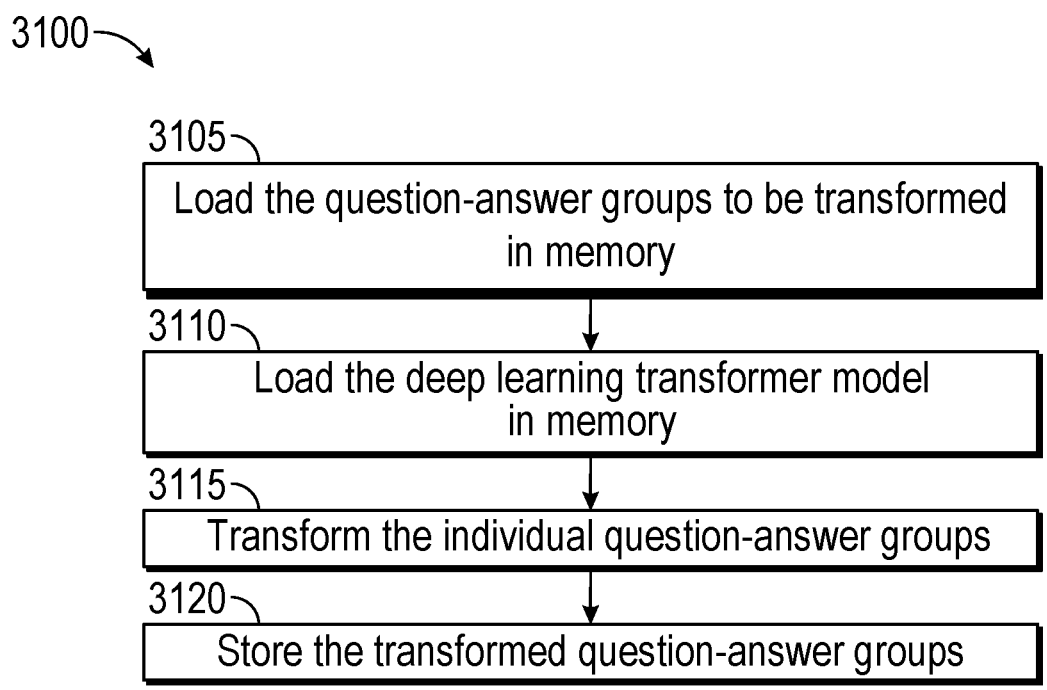
FIG. 31 shows an example of a flow chart for loading a deep learning transformer and using it to transform question-answer groups into declarative segments, according to various embodiments of the present disclosure.

FIG. 31 shows a flowchart 3100 that provides one example of an operation of a portion of the transforming application 145 involving a deep learning approach to transforming text into a canonical form using trained transformer models, as can be stored in model data 165, according to various embodiments. It is understood that the flowchart 3100 of FIG. 31 provides merely an example of the many different types of functional arrangements that may be employed to implement the operation of the portion of the transforming application 145 as described herein. As an alternative, the flowchart 3100 of FIG. 31 may be viewed as depicting an example of elements of a method implemented in the computing environment 105 (FIG. 1) according to one or more embodiments.

In step 3105, the transforming application 145 can load the question-answer groups to be transformed into memory from the intermediate data 170.

In step 3110, the transforming application 145 can load a trained model from the model data 165 into memory.

In step 3115, the transforming application 145 can transform the question-answer groups in the data to declarative segments.

In step 3120, the transforming application 145 can store the transformed question-answer groups in intermediate data 170. Thereafter, the transformation operation of the transforming application 145 ends.

FIGS. 32A-C show examples of tables that include results of experiments conducted for various methods of transforming question-answer groups into declarative segments. In this set of experiments, the legal deposition dataset, as well as the public dataset, were accessed from the dataset data 175. Each deposition was split into a combination of dialog acts. This enabled transforming a question-answer group using the specific methods that were developed for the combination of the question and answer dialog acts.

Various methods were evaluated relative to the correct canonical forms. One graduate student, along with volunteers, annotated the question-answer groups from the datasets. This involved annotating each question-answer group from the datasets 131 with a simple sentence or other suitable canonical form of the question-answer group. The annotated training data was treated as the ground truth during evaluation. The annotated training data can be stored in training data 160.

For the legal deposition dataset, 10 depositions were randomly selected from this collection. The dialog act of each question-answer group in the deposition was classified. The dataset statistics for each question and answer dialog act combination were computed. In the experiments, more examples from this dataset were used, compared to the other dataset. This was done to get more variation in the question and answer groups, in terms of the contained text.

For the public dataset, 10 depositions were randomly selected from this dataset. The dialog act of each question-answer group in the deposition was classified. The depositions from this dataset in general were longer than in the legal deposition dataset.

In the experiments, 10 of the top 11 dialog act classes for the legal deposition dataset were evaluated. The top 11 dialog act combinations represented more than 65% and 60% of the total data for the legal deposition and public datasets, respectively. This was a good set to target for the evaluation. The dialog act combinations that were left out represented less than 3% of the data individually. Transformation methods involving chunking methods were developed for 10 of the 11 dialog act classes.

For the experiments, several different methods for transformation of question-answer groups were considered. Examples of methods for transformation of the question-answer groups can include:

Use answer: The answer text was pre-processed to remove the noise and then the answer text was used as is. This approach considered whether the answer in isolation contained enough context, and how much information it contained relative to the ground truth.

Use question and answer: The question and the answer texts were pre-processed to remove the noise and then the combination of the question and answer text was used. This approach considered whether the concatenated question and answer contained enough context, and how much information it contained relative to the ground truth.

Use output of the chunking transformers: The question and the answer texts were pre-processed to remove the noise. The next step involved feeding the question and answer through the dialog act classification and chunking transformation pipeline. The evaluation was of the transformed sentences via the chunking methods relative to the ground truth.

Use output of the Deep Learning transformers: The question and the answer texts were pre-processed to remove the noise. Next the question and answer were fed through the dialog act classification and Deep Learning based transformation pipeline. The transformed sentences were evaluated relative to the ground truth. This experiment was performed for four specific dialog act combinations: [bin, y], [bin, n], [bin, y-d], and [bin, n-d].

Evaluation of text processing and transformation can be much more difficult than for simple classification since the results can often be subjective. One study involved using ROUGE-1/2 scores and sentence similarity in the evaluation. ROUGE can be used to compare the generated sentences and the canonical forms annotated by human actors. The ROUGE-1 and ROUGE-2 scores return how well the generated sentences overlap with the unigram and bi-gram representations of the annotated canonical forms, respectively.

Another evaluation metric that can be used is sentence similarity. Sentence similarity can help to determine if sentences are semantically equivalent. A pair of sentences was converted into vector representations in the form of embeddings, and then the cosine similarity measure, with the two sentence vectors, was used to estimate the similarity between them. Suitable embeddings can be any of the conventional embeddings generated, like BERT or word2Vec. Thus, InferSent, a sentence embedding method providing vector representations of English sentences, was used.

FIG. 32A shows results of the transformation experiments run on the legal deposition dataset for the use answer method, the use question and answer method, and the output of the chunking transformer method. ROUGE-1(R-1)/2(R-2) and the similarity (Sim) scores were given relative to the ground truth, for the generated sentences. The values were averaged across all of the samples for each dialog act combination. The best result is highlighted in bold for each dialog act combination.

FIG. 32B shows results of the transformation experiments run on the public dataset for the use answer method, the use question and answer method, and the output of the chunking transformer method. ROUGE-1(R-1)/2(R-2) and the similarity (Sim) scores were given relative to the ground truth, for the generated sentences. The values were averaged across all of the samples for each dialog act combination. The best result is highlighted in bold for each dialog act combination.

FIG. 32C shows results of the transformation experiments run on the legal deposition dataset for the use output of the deep learning transformers method. A person of ordinary skill in the art would know that improvements regarding such deep learning methods can result when a larger amount of training data is employed, which can be stored in training data 160.

Figure 33:
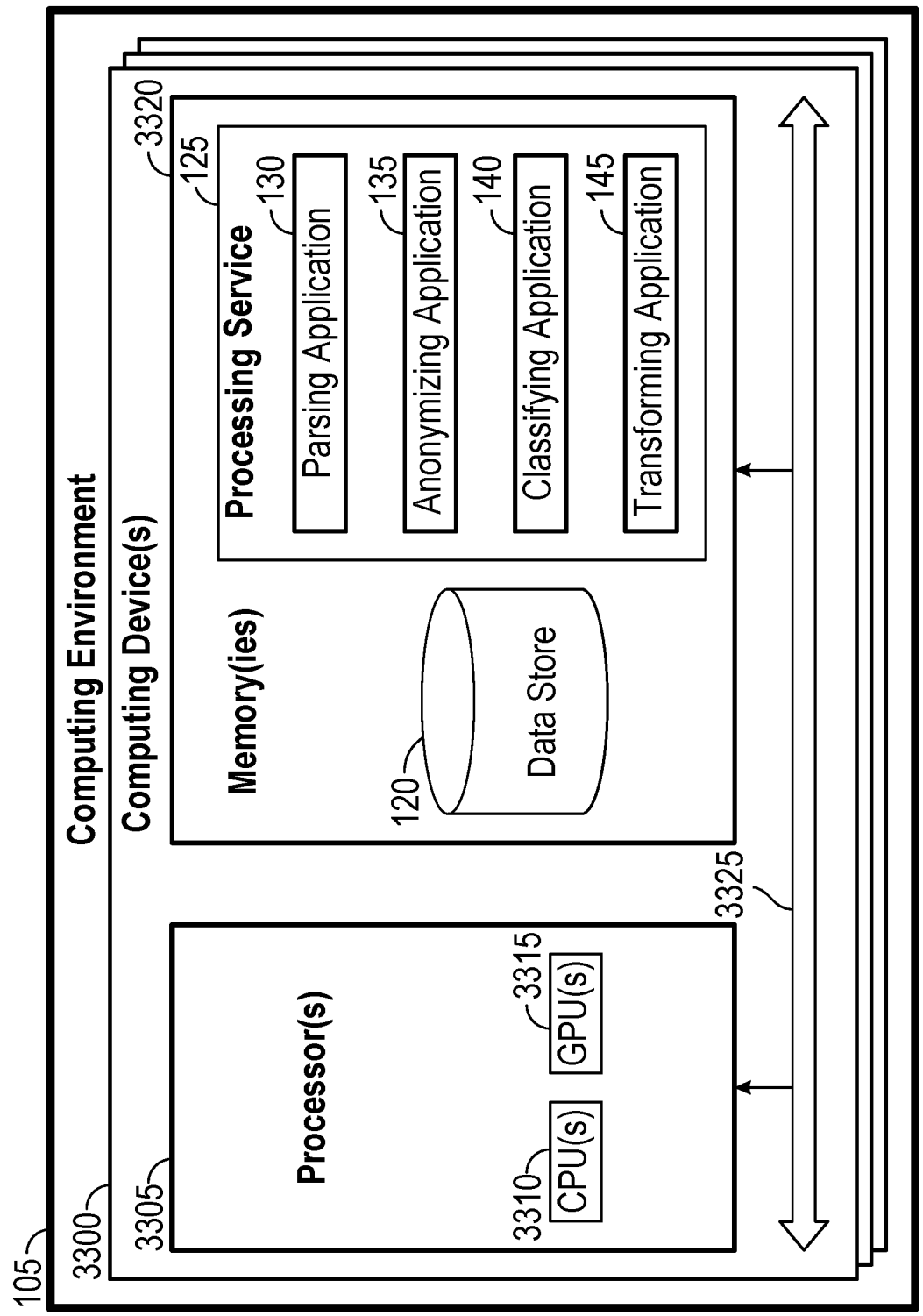
FIG. 33 shows an example of a computing environment with a computing device that can act as a server in this disclosure, according to various embodiments of the present disclosure.

FIG. 33 shows a schematic block diagram of the computing environment 105. The computing environment 105 can include one or more computing devices 3300. Each computing device 3300 includes at least one processor circuit, for example, having one or more processors 3305 (which can include one or more CPUs 3310, and one or more GPUs 3315), and one or more memories 3320, all of which can be coupled to a local interface 3325. To this end, each computing device 3300 can comprise, for example, a data bus with an accompanying address/control bus or other bus structure as can be appreciated.

Stored in the memory 3320 are several components that are executable by the processor 3305. In particular, stored in the memory 3320 and executable by the processor 3305 are one or more parsing applications 130, anonymizing applications 135, classifying applications 140, and transforming applications 145. Also stored in the memory 3320 along with network 115 can be other data. In addition, an operating system can be stored in the memory 3320 and executable by the processor 3305.

It is noted that the memory 3320 can store other executable-code components for execution by the processor 3305. For example, an operating system can be stored in the memory 3320 for execution by the processor 3305. Where any component discussed herein is implemented in the form of software, any one of a number of programming languages can be employed such as, for example, C, C++, C#, Objective C, JAVA®, JAVASCRIPT, Perl, PHP, VISUAL BASIC, PYTHON, RUBY, FLASH, or other programming languages.

As discussed above, in various embodiments, the memory 3320 stores software for execution by the processor 3305. In this respect, the terms "executable" or "for execution" refer to software forms that can ultimately be run or executed by the processor 3310, whether in source, object, machine, or other form. Examples of executable programs include, for example, a compiled program that can be translated into a machine code format and loaded into a random access portion of the memory 3320 and executed by the processor 3305, source code that can be expressed in an object code format and loaded into a random access portion of the memory 3320 and executed by the processor 3305, or source code that can be interpreted by another executable program to generate instructions in a random access portion of the memory 3320 and executed by the processor 3305, etc.

An executable program can be stored in any portion or component of the memory 3320 including, for example, a random access memory (RAM), read-only memory (ROM), magnetic or other hard disk drive, solid-state, semiconductor, universal serial bus (USB) flash drive, memory card, optical disc (e.g., compact disc (CD) or digital versatile disc (DVD)), floppy disk, magnetic tape, or other types of memory devices.

In various embodiments, the memory 3320 can include both volatile and nonvolatile memory and data storage components. Volatile components are those that do not retain data values upon loss of power. Nonvolatile components are those that retain data upon a loss of power. Thus, the memory 3320 can include, for example, a RAM, ROM, magnetic or other hard disk drive, solid-state, semiconductor, or similar drive, USB flash drive, memory card accessed via a memory card reader, floppy disk accessed via an associated floppy disk drive, optical disc accessed via an optical disc drive, magnetic tape accessed via an appropriate tape drive, and/or other memory component, or any combination thereof. In addition, the RAM can include, for example, a static random access memory (SRAM), dynamic random access memory (DRAM), or magnetic random access memory (MRAM), and/or other similar memory device. The ROM can include, for example, a programmable read-only memory (PROM), erasable programmable read-only memory (EPROM), electrically erasable programmable read-only memory (EEPROM), or other similar memory device.

The processor 3305 can be embodied as one or more processors 3305 and the memory 3320 can be embodied as one or more memories 3320 that operate in parallel, respectively, or in combination. Thus, the local interface 3325 facilitates communication between any two of the multiple processors 3305, between any processor 3305 and any of the memories 3320, or between any two of the memories 3320, etc. The local interface 3325 can include additional systems designed to coordinate this communication, including, for example, a load balancer that performs load balancing.

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present disclosure described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

As used herein, the term "dialog act" or "dialog act" can represent a communicative intention behind a speaker's utterance in a conversation.

As used herein, the term "chunking" can mean a process of extracting segments, or chunks, from a sentence based on certain rules relating to particular parts-of-speech.

As used herein, the term "chinking" can mean a process of defining what is not to be included in a chunk.

As used herein, the term "wh-question" can mean a question starting with a word like "who," "what," "when," "where," "why," or "how."

As used herein, the term "wh-declarative question" can mean a question starting with a word like "who," "what," "when," "where," "why," or "how", that can include more than one statement.

As used herein, the term "binary question" can mean a question that can be answered affirmatively or negatively.

As used herein, the term "binary-declarative question" can mean a question that can be answered affirmatively or negatively, and can be used for verification of an answer when the answer is in fact known.

As used herein, the term "open question" can mean a question that is general and not specific to a context.

As used herein, the term "choice question" can include a question that can offer a choice among several options as an answer.

As used herein, the term "numerical question" can mean a question that can be specific to a numeric quantity.

As used herein, the term "human-specific question" can mean a question that can be specific to one or more human beings or information concerning one or more human beings.

As used herein, the term "location question" can mean a question that can be specific to one or more locations.

As used herein, the term "entity question" can mean a question that can be specific to one or more other entities.

As used herein, the term "descriptive question" can mean a question that can be answered with a description of a person, place, thing, or event, as can be appreciated.

As used herein, the term "yes answer" can mean an affirmative answer to a question.

As used herein, the term "yes-declarative answer" can mean an affirmative answer to a question, that includes an explanation for the answer.

As used herein, the term "yes-followup answer" can mean an affirmative answer to a question, that includes another question relating to the question asked.

As used herein, the term "no answer" can mean a negative answer to a question.

As used herein, the term "no-declarative answer" can mean a negative answer to a question that includes an explanation for the answer.

As used herein, the term "no-followup" can mean a negative answer to a question that includes another question relating to the question asked.

As used herein, the term "non-opinion answer" can mean an answer that includes statements that are not opinion and can be informative.

As used herein, the term "opinion answer" can mean an answer that includes statements that are opinion rather than factual.

As used herein, the term "acknowledgement answer" can mean an answer that acknowledges a question or statement.

As used herein, the term "unknown answer" can mean an answer that is given when an answer to the question asked is unknown.

As used herein, the term "confrontational answer" can mean an answer that does not include information and is confrontational to the question asked.

As used herein, the term "token" can mean an instance of a plurality of characters in some particular text that are grouped together as a useful semantic unit for processing.

As used herein, the term "tokenization" can mean a part of the processing of text that includes chopping or otherwise separating a given sentence or unit of text into tokens or pieces so that certain characters can be removed.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

While the term "remove" and similar terms are used herein, it can be appreciated that the term "remove" and its various forms can also mean separate, extract, and other similar terms as can be appreciated.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

We claim:

1. A method for transforming question-answer groups into declarative segments, comprising:

identifying, by at least one computing device, a question-answer group from a plurality of question-answer groups;

parsing, by the at least one computing device, the question-answer group to identify a question and an answer;

classifying, by the at least one computing device, the question into a question dialog act category;

classifying, by the at least one computing device, the answer into an answer dialog act category; and applying, by the at least one computing device, a transformer to the question-answer group to obtain a declarative segment corresponding to the question-answer group based at least in part on the question dialog act category and the answer dialog act category, wherein applying the transformer to the question-answer group to obtain the declarative segment comprises:

identifying a plurality of part-of-speech tags for respective ones of a plurality of words in the question-answer group;

identifying a chunk pattern based at least in part on a combination of the question dialog act category and the answer dialog act category;

matching the chunk pattern to at least one chunk from the plurality of words based at least in part on the plurality of part-of-speech tags;

identifying a transformation rule from a plurality of transformation rules based at least in part on the chunk pattern and the combination of the question dialog act category and the answer dialog act category;

applying the transformation rule to the at least one chunk to obtain at least one transformed chunk; and generating the declarative segment based at least in part on the at least one transformed chunk.

2. The method of claim 1, further comprising accessing, by at least one computing device, a document comprising the plurality of question-answer groups.

3. The method of claim 1, further comprising selecting, by the at least one computing device, a transformer for obtaining the declarative segment based at least in part on the question dialog act category and the answer dialog act category.

4. The method of claim 1, further comprising:

classifying the question into the question dialog act category is based at least in part on a dialog act ontology; and classifying the answer into the answer dialog act category is based at least in part on the dialog act ontology.

5. The method of claim 4, wherein the dialog act ontology indicates that the question is one of a wh-question, a wh-declarative question, a binary question, a binary-declarative question, an open question, and a choice question.

6. The method of claim 4, wherein the dialog act ontology indicates that the answer is one of a yes answer, a no answer, a non-opinion answer, an opinion answer, an acknowledgement answer, an unknown answer, and a confrontational answer.

7. The method of claim 1, further comprising:
identifying, by the at least one computing device, at least one information field, from a list of particular types of information fields, in the plurality of question-answer groups;
generating, by the at least one computing device, an anonymized representation of the at least one information field; and
replacing, by the at least one computing device, the at least one information field with the anonymized representation in the plurality of question-answer groups.

8. A system for transforming question-answer groups into declarative segments, comprising:
a memory device to store computer-readable instructions thereon; and
at least one computing device configured through execution of the computer-readable instructions to:
identify a question-answer group from a plurality of question-answer groups;
parse the question-answer group to identify a question and an answer;
classify the question into a question dialog act category;
classify the answer into an answer dialog act category; and
apply a transformer to the question-answer group to obtain a declarative segment corresponding to the question-answer group,
wherein, to apply the transformer to the question-answer group to obtain the declarative segment corresponding to the question-answer group, the at least one computing device is configured to:
identify a plurality of part-of-speech tags for respective ones of a plurality of words in the question-answer group;
identify a chunk pattern based at least in part on a combination of the question dialog act category and the answer dialog act category;
match the chunk pattern to at least one chunk from the plurality of words based at least in part on the plurality of part-of-speech tags;
identify a transformation rule from a plurality of transformation rules based at least in part on the chunk pattern and
the combination of the question dialog act category and the answer dialog act category;
apply the transformation rule to the at least one chunk to obtain at least one transformed chunk; and
generate the declarative segment based at least in part on the at least one transformed chunk.

9. The system of claim 8, wherein the at least one computing device is further configured to select a transformer based at least in part on the question dialog act category and the answer dialog act category.

10. The system of claim 8, wherein the at least one computing device is further configured to:
classify the question into the question dialog act category based at least in part on a dialog act ontology; and
classify the at least one answer into the answer dialog act category based at least in part on the dialog act ontology.

11. The system of claim 10, wherein the dialog act ontology indicates that the question is one of a wh-question, a wh-declarative question, a binary question, a binary-declarative question, an open question, and a choice question.

12. The system of claim 10, wherein the dialog act ontology indicates that the at least one answer is one of a yes answer, a no answer, a non-opinion answer, an opinion answer, an acknowledgement answer, an unknown answer, and a confrontational answer.

13. The system of claim 8, wherein the at least one computing device is further configured to:
identify at least one information field, from a list of particular types of information fields, in the plurality of question-answer groups;
generate an anonymized representation of the at least one information field; and
replace the at least one information field with the anonymized representation in the plurality of question-answer groups.

14. A non-transitory computer-readable medium embodying at least one program that, when executed by at least one computing device, directs the at least one computing device to:
identify a question-answer group from a plurality of question-answer groups;
parse the question-answer group to identify a question and an answer;
classify the question into a question dialog act category;
classify the answer into an answer dialog act category; and
apply a transformer to the question-answer group to obtain a declarative segment corresponding to the question-answer group, wherein, to apply the transformer to the question-answer group to obtain the declarative segment corresponding to the question-answer group, the at least one computing device is configured to:
identify a plurality of part-of-speech tags for respective ones of a plurality of words in the question-answer group;
identify a chunk pattern based at least in part on a combination of the question dialog act category and the answer dialog act category;
match the chunk pattern to at least one chunk from the plurality of words based at least in part on the plurality of part-of-speech tags;
identify a transformation rule from a plurality of transformation rules based at least in part on the chunk pattern and the combination of the question dialog act category and the answer dialog act category;
apply the transformation rule to the at least one chunk to obtain at least one transformed chunk; and
generate the declarative segment based at least in part on the at least one transformed chunk.

15. The non-transitory computer-readable medium of claim 14, wherein to parse the question-answer group to identify the question and the answer, the at least one computing device is configured to:
- segment the plurality of question-answer groups into a plurality of portions of text;
- extract the question from the plurality of portions of text based at least in part on identifying question-indicative information within the plurality of portions of text; and
- extract the answer from the plurality of portions of text based at least in part on identifying answer-indicative information within the plurality of portions of text.

16. The non-transitory computer-readable medium of claim 14, wherein the question answer group is identified from a legal document.

17. The non-transitory computer-readable medium of claim 16, wherein, to apply the transformation rule to the at least one chunk to obtain the at least one transformed chunk, the at least one computing device is directed to: convert the at least one chunk to the at least one transformed chunk based at least in part on the transformation rule yielding a first-person description.

18. The non-transitory computer-readable medium of claim 14, wherein, to apply the transformer to the question-answer group to obtain the declarative segment corresponding to the question-answer group, the at least one computing device is further directed to:
- load a deep learning transformer corresponding to a combination of the question dialog act category and the answer dialog act category; and
- transform the question-answer group into the declarative segment using the deep learning transformer.

19. The non-transitory computer-readable medium of claim 18, wherein the at least one computing device is further directed to at least:
- instantiate the deep learning transformer, wherein the deep learning transformer comprises a sequence-to-sequence based machine translation model; and
- train the deep learning transformer based at least in part on a training dataset, the training dataset comprising a plurality of tuples, respective ones of the plurality of tuples comprising a training question, a training answer, and a training declarative segment.

20. The non-transitory computer-readable medium of claim 19, wherein the training declarative segment is a grammatically-correct and semantically-equivalent rewriting of a pair comprising the training question and the training answer.

* * * * *